United States Patent
Wintergerst et al.

(10) Patent No.: US 8,850,403 B2
(45) Date of Patent: Sep. 30, 2014

(54) PROFILING DATA SNAPSHOTS FOR SOFTWARE PROFILERS

(75) Inventors: Michael Wintergerst, Muhlhausen (DE); Dietrich Mostowoj, Ludwigshafen (DE); Ralf Schmelter, Wiesloch (DE)

(73) Assignee: SAP AG, Walldorf (DE)

( * ) Notice: Subject to any disclaimer, the term of this patent is extended or adjusted under 35 U.S.C. 154(b) by 537 days.

(21) Appl. No.: 12/631,704

(22) Filed: Dec. 4, 2009

(65) Prior Publication Data
US 2011/0138366 A1 Jun. 9, 2011

(51) Int. Cl.
*G06F 9/44* (2006.01)
*G06F 11/34* (2006.01)

(52) U.S. Cl.
CPC ........ *G06F 11/3476* (2013.01); *G06F 11/3466* (2013.01); *G06F 11/3495* (2013.01); *G06F 11/3409* (2013.01); *G06F 2201/875* (2013.01); *G06F 2201/86* (2013.01); *G06F 11/3438* (2013.01); *G06F 2201/815* (2013.01)
USPC ......................................................... 717/130

(58) Field of Classification Search
None
See application file for complete search history.

(56) References Cited

U.S. PATENT DOCUMENTS

| | | | |
|---|---|---|---|
| 6,721,941 B1 * | 4/2004 | Morshed et al. ............... | 717/127 |
| 6,732,357 B1 * | 5/2004 | Berry et al. .................... | 717/158 |
| 6,760,903 B1 * | 7/2004 | Morshed et al. ............... | 717/130 |
| 6,857,120 B1 | 2/2005 | Arnold et al. | |
| 6,954,923 B1 * | 10/2005 | Yates et al. .................... | 717/130 |
| 7,058,927 B2 | 6/2006 | Yenne et al. | |
| 7,120,901 B2 | 10/2006 | Ferri et al. | |
| 7,243,156 B2 * | 7/2007 | Hahn et al. .................... | 709/231 |
| 7,266,810 B2 | 9/2007 | Karkare et al. | |
| 7,568,185 B1 | 7/2009 | Shapiro et al. | |
| 7,577,875 B2 * | 8/2009 | Nelson et al. ............... | 714/38.14 |
| 7,614,043 B2 * | 11/2009 | Ognev et al. ................. | 717/126 |
| 7,712,082 B2 * | 5/2010 | Broman et al. ............... | 717/127 |
| 7,962,924 B2 | 6/2011 | Kuiper et al. | |
| 8,108,839 B2 | 1/2012 | Clark | |
| 8,117,599 B2 * | 2/2012 | Edmark et al. ................ | 717/127 |
| 8,141,044 B2 | 3/2012 | Mann et al. | |
| 8,141,053 B2 | 3/2012 | Levine | |

(Continued)

FOREIGN PATENT DOCUMENTS

WO WO2005002258 A1 1/2005

OTHER PUBLICATIONS

"Analyzing the Performance of WebLogic-based Applications with Sitraka Jprobe". Jun. 2002, A Sitraka Technical Paper; http://www.quest.com/probe/pdfs/jprobe_wls_practices.pdf.*

(Continued)

*Primary Examiner* — Don Wong
*Assistant Examiner* — Daxin Wu
(74) *Attorney, Agent, or Firm* — Fish & Richardson P.C.

(57) ABSTRACT

Implementations of the present disclosure provide methods including executing a profiling session to profile one or more applications running on a virtual machine executed on a server, collecting profiling data over a first time interval during the profiling session, receiving user input generated at a client device, the client device being in communication with the server, in response to the user input, generating a snapshot corresponding to a subset of the profiling data, the snapshot being identified based on a second time interval that is within the first time interval, and transmitting the profiling data to generate a snapshot view for display on a client device, the snapshot view corresponding to the subset of the profiling data.

24 Claims, 11 Drawing Sheets

(56) References Cited

U.S. PATENT DOCUMENTS

| | | | |
|---|---|---|---|
| 8,239,167 B2 | 8/2012 | Ramacher | |
| 8,261,245 B2* | 9/2012 | Branda et al. | 717/131 |
| 8,291,381 B2 | 10/2012 | Lai | |
| 8,429,467 B2 | 4/2013 | Fallen | |
| 2002/0174416 A1* | 11/2002 | Bates et al. | 717/128 |
| 2003/0225769 A1* | 12/2003 | Chkodrov et al. | 707/100 |
| 2004/0010571 A1* | 1/2004 | Hutchinson et al. | 709/220 |
| 2004/0078784 A1* | 4/2004 | Bates et al. | 717/129 |
| 2004/0093589 A1* | 5/2004 | Master | 717/136 |
| 2005/0022182 A1* | 1/2005 | Mittal | 717/178 |
| 2005/0071821 A1* | 3/2005 | Levine et al. | 717/130 |
| 2005/0155021 A1* | 7/2005 | DeWitt et al. | 717/130 |
| 2005/0216793 A1* | 9/2005 | Entin et al. | 714/38 |
| 2006/0075386 A1* | 4/2006 | Loh et al. | 717/124 |
| 2006/0206885 A1 | 9/2006 | Seidman et al. | |
| 2006/0218543 A1 | 9/2006 | Boger | |
| 2007/0006168 A1* | 1/2007 | Dimpsey et al. | 717/130 |
| 2008/0098364 A1* | 4/2008 | Gray-Donald et al. | 717/130 |
| 2008/0127149 A1* | 5/2008 | Kosche et al. | 717/158 |
| 2008/0148242 A1* | 6/2008 | Cobb et al. | 717/130 |
| 2008/0209402 A1* | 8/2008 | Parkinson | 717/124 |
| 2008/0243968 A1 | 10/2008 | Schmelter et al. | |
| 2008/0243969 A1 | 10/2008 | Wintergerst et al. | |
| 2008/0243970 A1* | 10/2008 | Schmelter et al. | 707/206 |
| 2008/0244529 A1* | 10/2008 | Hind et al. | 717/127 |
| 2008/0244531 A1 | 10/2008 | Schmelter et al. | |
| 2008/0244537 A1* | 10/2008 | Wintergerst et al. | 717/130 |
| 2008/0244546 A1* | 10/2008 | Schmelter et al. | 717/158 |
| 2008/0244547 A1* | 10/2008 | Wintergerst et al. | 717/158 |
| 2008/0263366 A1 | 10/2008 | Mauruthi | |
| 2008/0301650 A1 | 12/2008 | Talluri et al. | |
| 2009/0144713 A1 | 6/2009 | Russell et al. | |
| 2010/0017583 A1* | 1/2010 | Kuiper et al. | 712/227 |
| 2010/0017789 A1 | 1/2010 | DeWitt et al. | |
| 2010/0138811 A1* | 6/2010 | Jayaraman et al. | 717/125 |
| 2010/0235815 A1* | 9/2010 | Maybee et al. | 717/125 |
| 2010/0287352 A1 | 11/2010 | Chapman et al. | |
| 2011/0138363 A1 | 6/2011 | Schmelter et al. | |
| 2011/0138365 A1 | 6/2011 | Schmelter et al. | |
| 2011/0138385 A1 | 6/2011 | Schmelter et al. | |

OTHER PUBLICATIONS dynaTrace software, Continuous Application Performance Management Across the Entire Software Lifecycle, May 26, 2010, http://www.dynatrace.com/en/application-performance-management-product.aspx, 2 pages.

Eclipse Test & Performance Tools Platform Project, May 26, 2010, http://www.eclipse.org/tptp/ 2 pages.

Java Profiler—.NET Profiler—The profilers for Java and .NET professionals, The Industry Leader in .NET & Java Profiling, May 26, 2010, http://yourkit.com/, 2 pages.

Ko et al., "Debugging Reinvented: Asking and Answering Why and Why Not Questions about Program Behavior," Proceedings of the 30th International Conference on Software Engineering, ICSE'08, May 10-18, 2008, Leipzig, Germany, 10 pages.

Genbrugge et al., "Chip Multiprocessor Design Space Exploration through Statistical Simulation," IEEE Transactions on Computers, vol. 58, No. 12, Dec. 2009, pp. 1668-1681.

Gueheneuc et al., "No Java Without Caffeine—A Tool for Dynamic Analysis of Java Programs," Proceedings of the 17th IEEE International Conference on Automated Software Engineering (ASE'02), May 16, 2002, 16 pages.

McMaster et al., "Call-Stack Coverage for GUI Test Suite Reduction," IEEE Transactions on Software Engineering, vol. 34, No. 1, Jan./Feb. 2008, pp. 99-115.

IBM, "Method Profiling in Heavy Loaded Production J2EE Environment," ip.com, Aug. 23, 2006, 2 pages.

* cited by examiner

| Method 902 | Self Bytes | Total Bytes |
|---|---|---|
| java.lang.AbstractStringBuilder.expandCapacity(int):void | 12 MB | 12 MB |
| java.lang.String.<init>(char[],int,int):void | 11 MB | 11 MB |
| java.lang.AbstractStringBuilder.<init>(int):void | 7 MB | 7 MB |
| java.lang.String.substring(int,int):java.lang.String | 6 MB | 6 MB |
| java.util.HashMap.<init>():void | 5 MB | 5 MB |
| java.lang.Object.clone():java.lang.Object | 5 MB | 5 MB |
| com.sap.engine.services.deploy.ApplicationInformation.getDependants(... | 5 MB | 12 MB |
| java.util.HashMap.addEntry(int,java.lang.Object,java.lang.Object,int):void | 4 MB | 6 MB |
| java.util.AbstractList.iterator():java.util.Iterator | 3 MB | 3 MB |
| java.lang.StringBuilder.toString():java.lang.String | 2 MB | 8 MB |
| java.util.ArrayList.<init>(int):void | 2 MB | 2 MB |
| com.sap.engine.services.deploy.ReferenceObject.<init>():void | 2 MB | 2 MB |
| com.sap.mw.jco.JCO$Record.decodeBYTE(int,byte[] | 1 MB | 1 MB |
| java.util.HashMap.resize(int):void | 1 MB | 1 MB |
| com.sap.tc.esf.rpe.esp.SAXEventHandler$CompoundValue.<init>(com.sa... | 1 MB | 7 MB |
| com.sap.tc.esf.rpe.esp.SAXEventHandler$Table.createNestedStructure(#... | 1 MB | 8 MB |
| java.lang.Integer.toString(int):java.lang.String | 1 MB | 1 MB |
| com.sap.tc.esf.rpe.esp.SAXEventHandler$SimpleValue.<init>(com.sap.tc... | 1 MB | 5 MB |
| java.lang.ClassLoader.findLoadedClass0(java.lang.String):java.lang.Class | 1 MB | 1 MB |
| java.lang.Throwable.fillInStackTrace():java.lang.Throwable | 1 MB | 1 MB |
| java.nio.HeapByteBuffer.<init>(int,int):void | 1 MB | 1 MB |
| java.util.Vector.<init>(int,int):void | 1 MB | 1 MB |
| com.sap.tc.esf.sdo.core.EdoTable.getRow(int):com.sap.tc.esf.sdo.api.IE... | 1 MB | 2 MB |
| java.util.HashMap.<init>(int,float):void | 1 MB | 1 MB |

FIG. 9

PROFILING DATA SNAPSHOTS FOR SOFTWARE PROFILERS

BACKGROUND

Software applications running in a distributed application server environment may have a plurality of concurrent users accessing the servers and applications. This can result in performance and scalability problems with the servers and applications running on the servers. Performance monitoring, profiling and debugging tools can monitor software applications running on the servers to determine resource consumption information.

Software profiling is a technique for measuring where software application programs consume resources (e.g., central processing unit (CPU) computation times, memory accesses). A profiling tool or profiler can analyze the resource consumption of an application running on a server and provide profiling data based thereon. For example, a Java profiler can support a broad set of Java virtual machines (JVMs). The Java profiler can provide comprehensive profiling of a Java application running on the JVM.

SUMMARY

Implementations of the present disclosure provide computer-implemented methods for generating snapshots of profiling data. In some implementations, a method includes executing a profiling session to profile one or more applications running on a virtual machine executed on a server, collecting profiling data over a first time interval during the profiling session, receiving user input generated at a client device, the client device being in communication with the server, in response to the user input, generating a snapshot corresponding to a subset of the profiling data, the snapshot being identified based on a second time interval that is within the first time interval, and transmitting the profiling data to generate a snapshot view for display on a client device, the snapshot view corresponding to the subset of the profiling data.

In some implementations, the method further includes receiving user input indicating one or more logical filter definitions, wherein the snapshot is generated based on the one or more logical filter definitions. The one or more logical filter definitions can include one or more of a class name, a method name, a thread name, an application name, a user name, and an execution path.

In some implementations, the method further includes receiving first user input during running of the application, generating a first snapshot marker within the profiling data based on the first user input, and generating a second snapshot marker within the profiling data, wherein the second time interval is defined between the first and second snapshot markers. The method can further include receiving second user input during running of the application, wherein the second snapshot marker is generated based on the second user input.

In some implementations, the method further includes defining a report interval, the report interval indicating a frequency for generating a status report of the back-end application, generating a plurality of status reports based on the report interval, wherein each status report and a corresponding time are provided in the profiling data, and determining the second time interval based on a time corresponding to a first status report of the plurality of status reports and a time corresponding to a second status report of the plurality of status reports. Each report status can include at least one of a processing unit load, a number of performed garbage collections, and a time stamp.

In some implementations, the snapshot is generated in response to the application performing a specified event.

In some implementations, the method further includes generating a second snapshot corresponding to a subset of the profiling data associated with the snapshot, the second snapshot being generated based on applying a logical filter to the profiling data associated with the snapshot.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes at least a server including one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 9 is a screen-shot illustrating an alternative exemplar method statistic view included in a profiler perspective.

DETAILED DESCRIPTION

Implementations of the present disclosure are generally directed to generating one or more snapshots of profiling data corresponding to a profiled software application. More specifically, implementations of the present disclosure relate to a how a software profiling tool collects and stores original profiling data at a back-end, and provides snapshot profiling data for display at a front-end. For example, collected profiling data can be separated into one or more sub-regions, or snapshots, a snapshot referring to a certain time interval within an overall time interval, during which profiling data was collected. Furthermore, logical filter definitions can be applied to the profiling data to further parse the profiling data that is displayed to a user in a snapshot.

Figure 1:
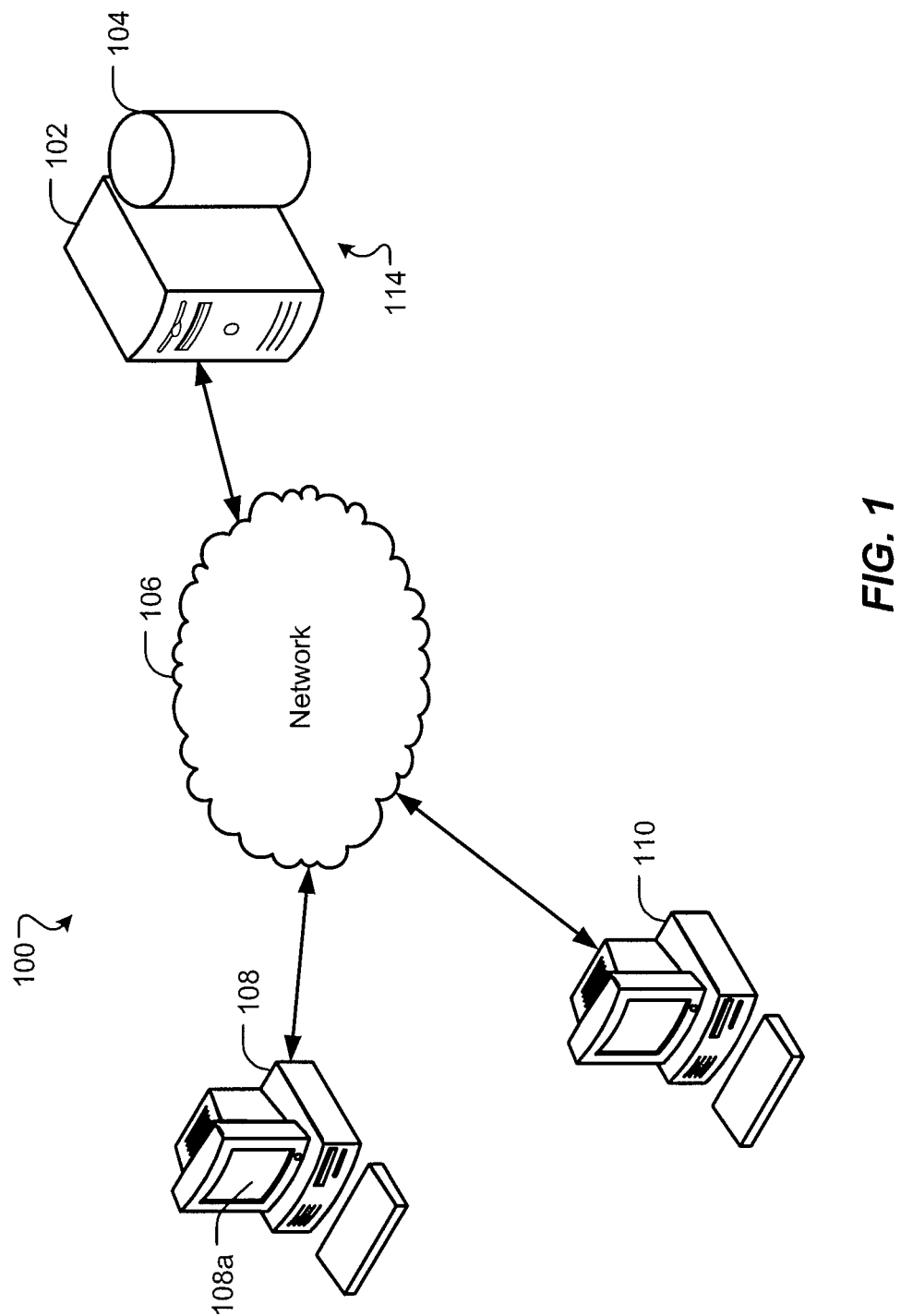
FIG. 1 is a diagram of an exemplar network architecture that can be used in accordance with implementations of the present disclosure.

Referring now to FIG. 1, a schematic illustration of an exemplar system 100 in accordance with implementations of the present disclosure can include a plurality of clients 108, 110, and a computer system 114. The computer system 114 can include a server 102 and a database 104. In some implementations, the system 100 may represent a client/server system supporting multiple computer systems (e.g., computer system 114) including one or more clients (e.g., clients 108, 110) and/or one or more servers (e.g., server 102) that are connectively coupled for communication with one another over a network 106. In some implementations, the clients (e.g., clients 108, 110) may be directly connected to the one or more servers (e.g., server 102) (without connecting by way of network 106).

The clients 108, 110 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 108, 110 may access application software on the server 102.

The server 102 can represent various forms of servers including, but not limited to a web server, an application server, a proxy server, a network server, or a server farm. For example, the server 102 can be an application server that executes software accessed by clients 108, 110. In operation, multiple clients (e.g., clients 108, 110) can communicate with the server 102 by way of network 106. In some implementations, a user can invoke applications available on the server 102 in a web browser running on a client (e.g., clients 108, 110). Each application can individually access data from one or more repository resources (e.g., database 104). For example, the server 102 can access database 104.

In some implementations, the client devices 108, 110 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. For example, the communication may occur through a radio-frequency transceiver (not shown). In addition, short-range communication may occur, such as using a Bluetooth, WiFi, or other such transceiver.

In some implementations, the system 100 can be a distributed client/server system that spans one or more networks such as network 106. The network 106 can be a large computer network, such as a local area network (LAN), wide area network (WAN), the Internet, a cellular network, or a combination thereof connecting any number of mobile clients, fixed clients, and servers. In some implementations, each client (e.g., clients 108, 110) can communicate with the server 102 via a virtual private network (VPN), Secure Shell (SSH) tunnel, or other secure network connection. In some implementations, the network 106 can include the Internet, a wireless service network and may include the Public Switched Telephone Network (PSTN). In other implementations, the network 106 may include a corporate network (e.g., an intranet) and one or more wireless access points.

Each client (e.g., clients 108, 110) can establish its own session with the server 102. Each session can be semi-permanent as it can be established at one point in time and torn down at another. Each session can involve two-way information exchange between the computer system 114 and each individual client 108, 110. For example, a Hypertext Transfer Protocol (HTTP) session enables the association of information with individual users. A session can be stateful where at least one of the communicating parts (e.g., the server 102 or the client (e.g., clients 108, 110)) can save information about the session history in order to be able to communicate. Alternatively, stateless communication includes independent requests with associated responses.

Multiple clients (e.g., clients 108, 110) can communicate via network 106 with the server 102. In order to run an application each client (e.g., clients 108, 110) can establish a corresponding session with the application server 102. In some implementations, a user can initiate a profiling session for an application running on the server 102 using the client 108. The client 108 can establish the profiling session with the server 102. The profiling session can profile an application running on a Java virtual machine (JVM) on the server 102. For example, a profiler, included on the server 102, can record and store profiling data for a profiling session in the database 104 for analysis by the user running the profiling session from the client 108. In some implementations, the profiling data can be stored in a file system on the server 102. The profiler can also send the profiling data to the client 108 for analysis by the user. The client 108 can display the profiling data recorded for the application running on the JVM in a graphical user interface (GUI) displayed on display device 108a on the client 108.

As used herein, the term profiling data generally refers to map data and event data. Map data can include a mapping between numeric identifiers and VM structure entities such as stack traces, thread names, classes, methods, and class loaders, for example. Event data directly relates to profiled actions occurring in a VM. Exemplar actions can include the start of threads, object allocations (e.g., for the allocation trace), method enter events, method exit events, and the actual method parameters (e.g., for the method parameter trace), sampled thread stack traces (e.g., for the performance trace), and/or garbage collection events. The map data can be referenced in the event data. Consequently, instead of writing explicit class specifications, method specifications, and complete stack traces within the event data, only the corresponding numeric identifier need be written. In this manner, the amount of event information (from a memory perspective) can be drastically reduced.

Figure 2:
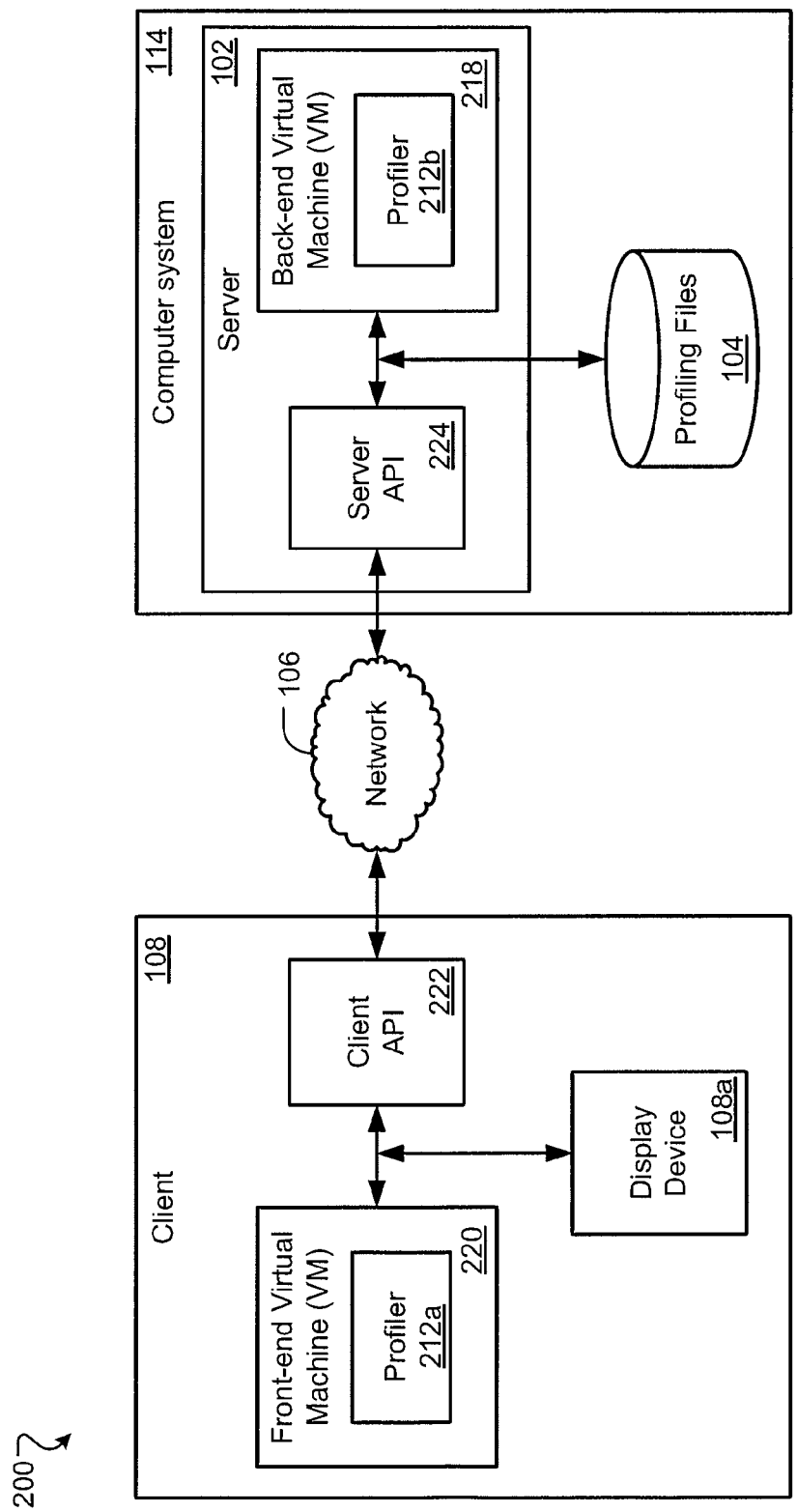
FIG. 2 is a block diagram of an exemplar system that includes a profiler.

FIG. 2 is a block diagram of an exemplar system 200 that includes a profiler. The system 200 is implemented as a client/server system, an example of which can include system 100 of FIG. 1. The exemplar system 200 can be implemented using client 108, network 106 and computer system 114 that includes server 102 and database 104.

For example, the profiler can analyze the resource consumption of an application running on a JVM. In some implementations, the application can be a standalone Java application. In some implementations, the application can be a complex enterprise application that can utilize a plurality of resources. For example, the profiler can be the JVM Profiler provided by SAP AG.

The profiler can include two components: a profiler front-end component (front-end profiler 212a) and a profiler back-end component (back-end profiler 212b). The back-end profiler 212b can be integrated into a back-end virtual machine (VM) 218. In some implementations, a native application can be provided as a front-end, the native application understanding the profiling protocol of the back-end. In some implementations, the front-end profiler 212a can be integrated into a front-end VM 220. For example, the back-end VM and the front-end VM can each be a JVM provided by SAP AG. The JVM can run one or more applications integrated with the back-end profiler 212b in the back-end VM 218 and provides for connection to the front-end profiler 212a. The back-end profiler 212b can provide profiling data for one or more applications running on the back-end VM 218. The front-end profiler 212a can provide a visual representation of the profiling data provided by the back-end profiler 212b (e.g., client 108 can include front-end profiler 212a and display device 108a can display the profiling data to a user in a GUI).

For example, a back-end profiler for a JVM can expose profiling data from a Java application executing on a back-end VM. The back-end profiler can use a Java Virtual Machine Tool Interface (JVMTI) to collect profiling data from the JVM. In some implementations, the JVM can provide an interface to load the back-end profiler (e.g., as an agent) into the JVM process. In some scenarios, a proprietary implementation can directly integrate the back-end profiler into the JVM. For example, the SAP® JVM can include a proprietary back-end profiler directly integrated into the back-end VM.

In some implementations, during a profiling session, a user can directly connect to the VM that includes the profiler (e.g., back-end VM 218 that includes back-end profiler 212b). The user can interactively request profiling data be sent from the back-end profiler 212b to the front-end profiler 212a. Profilers 212a, 212b can communicate with each other using client application programming interface (API) 222 and server API 224, respectively. For example, computer system 114 can establish a socket connection between the back-end profiler 212b and front-end profiler 212a. The profilers 212a, 212b can be located on physically different machines (e.g., client 108 and server 102, respectively). The profiling data can be transferred from the back-end profiler 212b to the front-end profiler 212a (e.g., by way of a socket connection or the transfer of one or more files). The front-end profiler 212a can receive the profiling data and prepare it for analysis and display to a user. For example, the front-end profiler 212a can display the profiling data in a GUI on display device 108a. In some implementations, the profiling data can be transferred using a file transfer.

In some implementations, the computer system 114 may directly connect to client 108 without the use of network 106. In some implementations, the front-end VM 220 and back-end VM 218 including profiler 212a and profiler 212b, respectively, may run on the same machine where client 108, server 102 and database 104 are included on the same physical machine.

The front-end profiler 212a can be a stand alone application that can communicate with the back-end profiler 212b included in the back-end VM 218 without the need for a front-end VM. More specifically, a front-end profiler may be a stand-alone program or application that is compatible with a back-end profiler. In some implementations, the front-end VM 220 can run the front-end profiler stand-alone application. The front-end profiler stand-alone application can analyze additional stand-alone applications running on the front-end VM 220. The front-end profiler stand-alone application can also analyze applications running on the back-end VM 218.

In some implementations, the profilers 212a, 212b can be integral parts of VMs 220, 218, respectively. This can allow for "on-demand" examination of applications running on the back-end VM 218. Because the VMs 220, 218 include profilers 212a, 212b, respectively, profiling can occur during runtime without the need to restart the VMs 220, 218. Including a profiler in a VM reduces the memory usage typically required, thereby minimizing the memory overhead of the computer system (e.g., computer system 114).

The server API 224 can start and stop the VM included in the back-end VM 218 that includes the application for profiling. The back-end profiler 212b can record the profiling data for the application running on the back-end VM 218. In some implementations, the back-end profiler 212b can store the profiling data as one or more profiling files in the database 104. In some implementations, the back-end profiler 212b can send the profiling data to the front-end profiler 212a for further processing. For example, an SAP® JVM's debug connection can connect the client 108 to the server 102 to communicate profiling data from the back-end profiler 212b to the front-end profiler 212a using server API 224 and client API 222, respectively.

In some implementations, a developer can use a multi-language software development environment to implement, test and debug a software project. The software development environment can be an open architecture software development platform that includes an integrated development environment (IDE) and a plug-in system. The plug-in system can allow extensions to the IDE with the ability to integrate custom tools. The plug-in system can provide a framework for integrating user-made applications and infrastructure components. For example, a front-end profiler that includes a user interface can be provided as a plug-in to the software development platform. For example, the front-end profiler can be an Eclipse plug-in that can be integrated into an Eclipse platform. The Eclipse platform can provide an IDE for implementing, testing and debugging Java based software development projects. An Eclipse platform that includes a front-end profiler plug-in can additionally provide profiling of Java based software development projects. For example, the front-end profiler 212a can be a plug-in to a software development platform running on the front-end VM 220.

A remote profiling session can occur when a host or server (e.g., server 102) that includes the application for profiling is remotely located from the client (e.g., client 108) running the application that initiates the profiling session. For example, system 200 shows an exemplar remote profiling session where the back-end VM 218 is running an application that includes the back-end profiler 212b and the client 108 initiates the profiling session from the front-end VM 220, which includes front-end profiler 212a. In a remote profiling session, opening a debugging port to the back-end VM 218 can switch the back-end VM 218 into a profiling mode. Using client 108, a user can connect to the back-end VM 218 for profiling by connecting to the debugging port. As shown in FIG. 2, the back-end profiler 212b is an integral part of the back-end VM 218. As described above, this can allow the back-end VM 218 to be switched into a profiling mode "on demand" during execution of the back-end VM application without the need to restart the back-end VM application.

In some implementations, a local profiling session can occur when the application for profiling and the application that initiates the profiling session are located on the same host or server (e.g., the same physical machine). The local profiling session can perform simultaneous source code implementation, testing, debugging and profiling. The host can include a local display device that displays a GUI to a user. The GUI can allow the user the ability to control and configure the profiling session.

In some implementations, a user can perform a remote or local profiling session in an online or interactive mode. In an online profiling session, a front-end profiler (e.g., front-end profiler 212*a*) can initiate a profiling session with a back-end profiler (e.g., back-end profiler 212*b*). For example, a user interacting with a GUI displayed on display device 108*a* can start and stop the profiling session as well as interact with the back-end profiler 212*b* during the profiling session. The interaction can include configuring and controlling the profiling session as well as receiving profiling data. The user can request the resultant profiling data from the back-end profiler 212*b* for display on the display device 108*a*. The back-end profiler 212*b* can open a debugging port to the back-end VM 218 when the front-end profiler 212*a* initiates an online profiling session with the back-end profiler 212*b*. The back-end VM 218 can then wait for a connection. The front-end VM 220 that includes the front-end profiler 212*a* can connect to the debugging port using client API 222 and server API 224 by way of network 106.

In some implementations, in an online profiling session, a user may optionally store the profiling data received from the back-end VM in a local file (e.g., a file located on the client 108 as part of a local file system or repository). The user can access the locally stored profiling data file at any time after the completion of the profiling session.

In some implementations, a user can perform a remote or local profiling session in an offline or non-interactive mode. In an offline profiling session, a front-end profiler (e.g., front-end profiler 212*a*) can initiate a profiling session with a back-end profiler (e.g., back-end profiler 212*b*) but there is no interaction between the front-end profiler (e.g., front-end profiler 212*a*) and the back-end profiler (e.g., back-end profiler 212*b*) during the profiling session. For example, the system 200 can provide an interface to couple the front-end VM 220 to the back-end VM 218 using the server API 224 in order to start and stop the profiling session. The back-end VM 218 that includes the back-end profiler 212*b* can store the profiling data in the database 104, and/or a file. For example, a user interacting with a GUI displayed on the display device 108*a* can start and stop the profiling session. Once complete, the user can request the profiling data stored in the file in the database 104 from the computer system 114 (e.g., the user can interact with a GUI displayed on display device 108*a* to initiate the request). The client 108 can receive the profiling data file and display its contents to the user on display device 108*a*.

Figure 3:
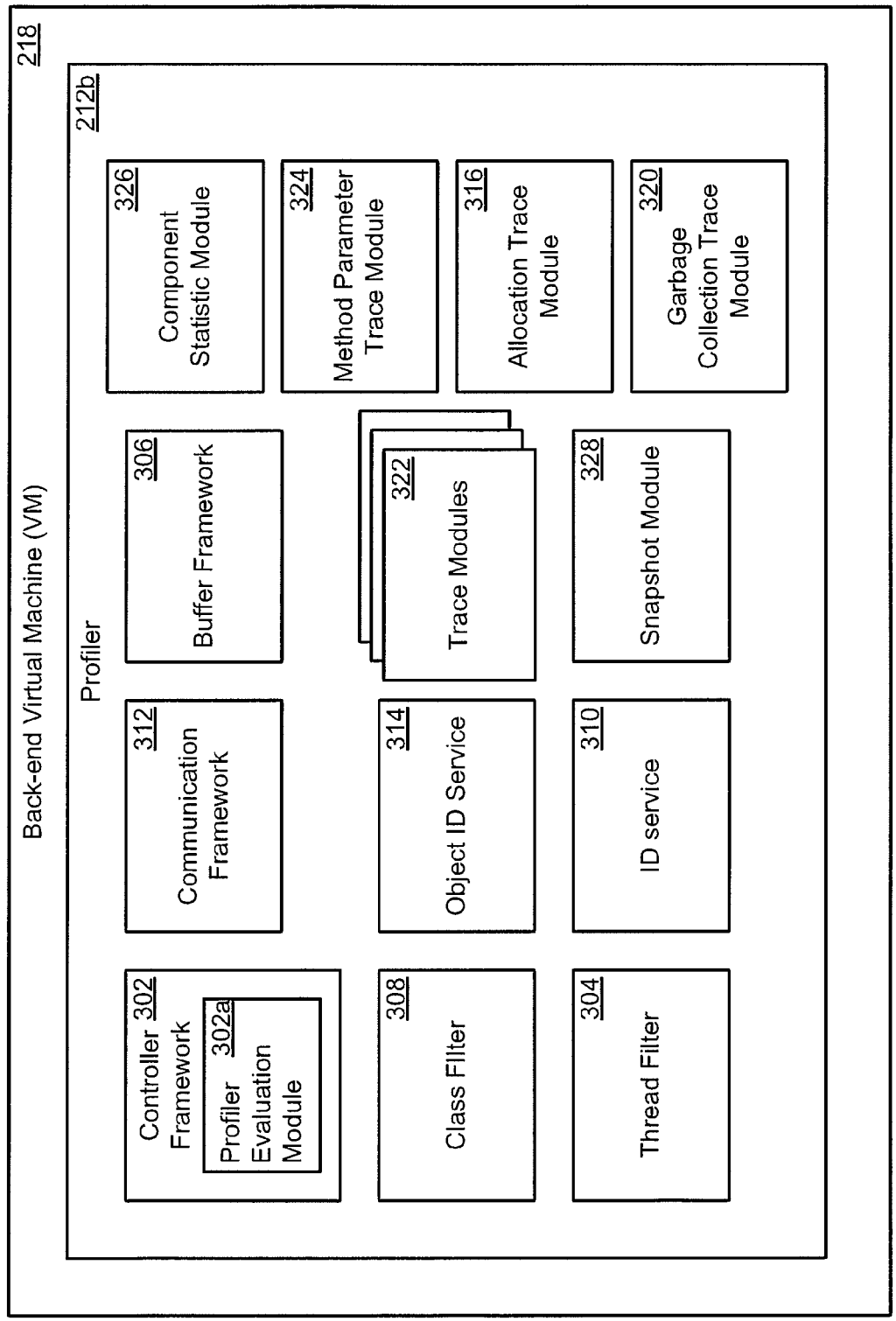
FIG. 3 is a block diagram of an exemplar profiler included in an exemplar back-end virtual machine (VM).

In an offline profiling session, storing profiling data for the profiling session in a profiling file on database 104 can enable a user to retrieve profiling data for a back-end VM (e.g., back-end VM 218) at any point after the profiling session is complete. For example, the stored profiling data can be retrieved from the database 104 whether or not the back-end VM (e.g., back-end VM 218) is running FIG. 3 is a block diagram of an exemplar profiler (e.g., back-end profiler 212*b*) included in an exemplar back-end VM (e.g., back-end VM 218). The back-end profiler 212*b* can include a plurality of profiler modules, filters and frameworks. The back-end profiler 212*b* can include an allocation trace module 316, a method parameter trace module 324 and additional trace modules 322. Each profiler trace module can capture a stream of events that match the criteria of the module (e.g., an allocation trace module can record all memory allocation events in the profiled application).

The back-end profiler 212*b* can include a controller framework 302. In some implementations, the controller framework 302 can start and stop profiling sessions as well as traces during a profiling session. The controller framework 302 can allow a user to select specific back-end profiler options and settings for a profiling session. For example, the front-end profiler 212*a* can display a GUI to the user on display device 108*a* that displays the options and settings for the back-end profiler 212*b*. The user, interacting with the GUI, can select specific back-end profiler options and settings for a profiling session.

The back-end profiler settings can include functional settings and filter settings. Functional profiler settings can determine the functional area of the application code to profile. For example, a functional profiler setting can specify the types of traces to perform for the profiling session (e.g., an allocation trace, a method parameter trace, and/or a performance trace). Filter profiler settings can define a validity scope (e.g., user, session, thread, VM, etc.) for the functional profiler setting for the profiling session. For example, referring to FIG. 2, a user, operating client 108, can start an allocation trace in the back-end profiler 212*b*. The validity scope of the profiling session can be for the user.

The profiler options can include specific monitoring, debugging and analysis functions. For example, profiler options can include memory debugging (e.g., memory leak detection), performance analysis (e.g., hotspot identification), synchronization monitoring, and application debugging (e.g., called method detection). By way of non-limiting example, the profiling functions can include one or more sub-functions (e.g., heap dump, time-based sampling, memory-based sampling, allocation trace, method parameter trace, garbage collection trace, etc.). Allocation analysis can identify and isolate memory related problems in an application. Allocation analysis can be used for memory debugging.

Performance analysis can monitor an application's behavior using information gathered as the application executes. Performance analysis can determine which parts of an application can be optimized for speed. In some implementations, performance analysis can indicate where within the application the method spent its time during execution thereof. Performance analysis can indicate which methods called other methods while the application executes. The profiling data gathered during a performance analysis can indicate which areas of the application are slower than expected. Performance hotspots (or bottlenecks) can be code segments in the application that can contribute significantly to overall application execution time. In some implementations, a performance hotspot can slow down or halt application execution. Identification of performance hot spots enables improvement of the code segment to improve the overall performance of the code at runtime.

In some implementations, the controller framework 302 may include a profiler evaluation module 302*a* for analyzing profiling data. The server API 224 can obtain the complete profiling data for a profiling session. The profiler evaluation module 302*a* can analyze the complete profiling data for the profiling session and generate problem oriented, condensed profiling data for the profiling session. The server API 224 can also obtain the condensed profiling data from the back-end VM 218. A user may use the condensed profiling data to identify one or more problematic areas in a profiled application. For example, a profiling session can perform a performance analysis on an application using a time-based sampling approach. The time-based sampling approach for performance analysis can be referred to as a statistical analysis. In some implementations, a profiling session can perform a performance analysis on an application using one or more actual events in the application (e.g., a method call) as indicators for tracing the execution path of the application.

In some implementations, the back-end provides low-level profiling data to the front-end for higher-level evaluation of the profiling data at the front-end. For example, the server 102 can provide the raw profiling data to the client 108. The client 108 can process the raw profiling data to provide a high-level evaluation thereof. In other implementations, the profiler evaluation module 302*a* can analyze the complete profiling data for a profiling session. The profiler evaluation module 302*a* can generate condensed profiling data directed towards the identified time-consuming methods within the profiled application. The server API 224 can enable the client 108 by way of network 106 and client API 222 to receive the condensed profiling data from the back-end VM 218. The client 108 can display the condensed profiling data to a user in a GUI on the display device 108*a*.

In some implementations, a user can use the controller framework 302 to start and stop profiling sessions, and to enable profiler traces for a session. For example, the user can determine one or more profiler traces to enable during a profiling session. In a single profiling session, the user may enable an allocation trace that uses the allocation trace module 316 and a method parameter trace that uses the method parameter trace module 324.

In some implementations, the controller framework 302 can enable the server 102 to specify a thread filter 304. The thread filter 304 can include names and identifiers associated with a profiling session for a particular thread (e.g., a thread executing on the back-end VM 218) and can indicate the existence of one or more profiler traces for the profiling session. For example, the names and identifiers can be a client identifier, a user identifier, a profiling session identifier, a request identifier, an application name and a component name. By way of non-limiting example, the thread filter 304 can filter out specific events in the profiling data (e.g., all allocations from a specified thread). In some implementations, the controller framework 302 can "tag" the names and identifiers to the thread. The server can set the current thread state using the information in the thread filter 304.

Class filters 308 can limit the recording of profiling data for a particular trace to a designated method within a class included in the class filters 308. For example, when enabling an allocation trace in a profiling session, a user can enable a profiler to record allocation trace data for Java object allocations, which refer to instances of the java.lang.HashMap class. The java.lang.HashMap class can be included in the class filter 308.

A buffer framework 306 can compress or decompress profiling data. The compressed or decompressed profiling data can be communicated (e.g., sent to the client 108) or stored (e.g., placed in a profiling file and stored in database 104). For example, in an offline profiling session, the buffer framework 306 can compress profiling data for storage as a profiling file in database 104. When requested by a client (e.g., client 108), the buffer framework 306 can decompress the profiling data in the profiling file for communication back to the client (e.g., client 108) and subsequent viewing of the profiling data by a user in a GUI on a display device (e.g., display device 108*a*).

Communication framework 312 can facilitate the communication of profiling data and information between and within various components (e.g., elements, modules, systems, servers, VMs, etc.) included in the computer system 114. Additionally, the communication framework 312 can determine and facilitate the storing of profiling data (e.g., profiling data in a profiling file stored in database 104).

An identification (ID) service 310 can assign a numerical identifier to an alphanumeric name. For example, the ID service 310 can assign a numeric identification value to a class name (e.g., java.lang.HashMap class can be assigned the number "101") creating a numeric ID tag for the class. A numerical identifier can also be assigned to a method, a class and/or a class loader. For example, because a class, a method and/or class loader are not just specified by their name (e.g., there can be more classes of the same name, if they are loaded by different class loaders), using just a name to ID mapping would not allow to differentiate between different class, method or class loader of the same name. In some implementations, a mapping packet can map and group classes, methods and/or class loaders according to their numerical ID tags (e.g., their assigned numerical values). In some implementations, the ID service 310 can assign numeric IDs to threads. An object identification (ID) service 314 can assign numeric IDs to objects. The use of numeric IDs can result in improved efficiency and speed during a profiling session as objects, threads, methods and classes can be sorted, grouped and compared using the numeric IDs instead of an alphanumeric name. The use of numeric IDs can also result in decreased memory consumption during a profiling session.

A method parameter trace module 324 can trace the values of method parameters. For example, a method parameter trace can check if specific parameter values used in a method lead to excessively long execution times for the method. Additionally, a method parameter trace can provide an overview of the parameter values used by the method during the execution of the application in a profiling session.

In some implementations, and as noted above, the raw profiling data can be provided to the front-end from the back-end for higher-level processing. For example, the front-end can process the profiling data to group one or more consecutive methods in a stack trace into a component, and categorize the trace data at the stack level. For example, when a profiling session includes a time-based sampled allocation trace, the memory allocation quantity can be attributed to a stack trace. In other implementations, the higher-level processing can occur at the back-end. For example, a component statistic module 326 can group one or more consecutive methods in a stack trace into a component. A component can be a specific application programming interface (API) used by the application. Examples of components can be Java components that can include, but are not limited to, a persistence API, a security API, a portal API and a servlet API. The methods in the stack trace can be grouped into components based on a defined "entry method" for the component. The component statistic module 326 can then categorize the trace data at the stack level. The stack trace including methods can be grouped into components, where one or more consecutive methods can be placed into one component group. Each component group can provide allocation statistics for the API associated with the component.

A garbage collection trace module 320 can trace garbage collection (GC) events in an application. For example, a Java runtime environment can use a garbage collector to perform garbage collection to reclaim no longer needed memory allocated to an object. Once the garbage collector determines that the object is no longer accessible (e.g., when there is no longer any references to it stored in any variables, the fields of objects, or the elements of any arrays), the garbage collector can reclaim the allocated memory. For example, when a Java application no longer references a particular object, a heap space occupied by the object can be recycled so that the heap space can be made available for subsequently created objects.

As discussed in further detail below, the profiling data into sub-regions or snapshots. A snapshot can be a specific timeframe or interval where profiling data was collected. For example, a user can create a snapshot by selecting a corresponding entry within a context menu of a profiling trace entry in a profile view. As another example, the profiling data can be read at the front-end (e.g., after finishing a dialog step) and the user can input a command to create a snapshot. In response, the front-end can send a command to the back-end to create a snapshot of the profiling data. Consequently, the back-end inserts a snapshot marker into the original profiling data. In the case where the user would like to create a sub-snapshot (e.g., a snapshot within a snapshot), or the user would like to create a snapshot from an arbitrary time period, the front-end can identify the corresponding sections, or sub-regions in the original profiling data, and can read the profiling data for that section.

Analysis of profiling data can identify the impact on system performance of individual software modules in an application. For example, profiling data can indicate the percentage of overall runtime for a software module in an application. Optimization of the software modules that contribute a large percentage of the overall runtime can result in marked system improvements with minimal changes. Profiling data can also indicate where within the software module optimization can be performed to improve the module's overall performance in the system.

For example, time-based sampling can provide an overview of methods in an application that consume the most CPU resources. Time-based sampling can provide a stack trace of the currently active thread at regular intervals. Analysis of time-based sampling can identify a method that consumes a large number of CPU or system resources. For example, the consumption of a large number of system resources by the method can be the result of an expensive method call. For example, the consumption of a large number of system resources by the method can also be the result of calling the method often. A method statistic trace, which can be included in a module with trace modules 322, for example, can determine the number of times a particular method is called. The method statistic trace together with time-based sampling can provide a time method trace that can calculate the average runtime of a specific method (e.g., the "cumulative time" divided by the method count).

For example, memory-based sampling can provide an overview of methods in an application that consume the most memory resources. Memory-based sampling can provide a stack trace after memory is allocated on a memory heap. Memory-based sampling can identify the methods that allocate the largest number of bytes on the memory heap.

Input/output (I/O) based sampling can provide an overview of I/O operations performed and I/O resources used by methods in an application. For example, operating a network connection at its maximum bandwidth can consume a large percentage of I/O resources. An I/O trace, which can be included in a module with trace modules 322, for example, can trace the timing of I/O operations in a method. The I/O trace can provide data about I/O operations, as well as data about a file being written and/or the network address/port being used.

Analysis of the I/O trace data can provide information about I/O operations that can include, but is not limited to, the amount of data transmitted by an I/O operation, the amount of CPU resources used by an I/O operation, and the number of I/O operations performed by a method. The analysis of the I/O trace data can identify I/O operations that transmit an excessive amount of data. The analysis of the I/O trace data can identify I/O operations that consume an excessive number of CPU resources. The analysis of the I/O trace data can identify if a method performs an excessive number of I/O operations.

Synchronization monitoring of a software application can provide information related to multithreading and concurrency. For example, problems associated with multithreading and concurrency can include, but are limited to, deadlocks, race conditions, thread starvation and scalability. In some implementations, a monitor trace, which can be included in a module with trace modules 322, for example, can identify deadlock and scalability issues in an application by acquiring information about the locks used in a VM. Synchronization monitoring can provide an overview of the most contented locks within an application. In this manner, a user can be made aware of which threads are waiting (e.g., threads that explicitly call wait( )on a Java object/monitor) and which threads are blocked (e.g., threads that want to enter a monitor section), as well as how long the threads are typically waiting and/or blocked. Further information can be provided with regard to the waiting and/or blocked threads. For example, culprit threads can be identified, a culprit thread being a thread that is holding the desired locks.

In some implementations, software profiling can provide additional application debugging functionality. For example, a method count trace, which can be included in a module with trace modules 322, for example, can provide the number of calls to a particular method. An execution line trace, which can be included in a module with trace modules 322, for example, can provide information regarding the number of lines of executed and unexecuted application source code. A method call trace, which can be included in a module with trace modules 322, for example, can provide the methods called by an application.

In some implementations, a method trace can be implemented to trace an application debugging process. The method trace, which can be included in a module with trace modules 322, for example, can trace the application program flow to a designated point in the source code. The method trace can provide information as to how the application program reached the designated point in the source code.

Referring to FIGS. 1 and 2, the client 108 can provide a GUI to a user for display on display device 108*a* that can allow the user to start, stop and control profiling sessions in the back-end profiler 212*b* using the client API 222 in communication with the server API 224 by way of network 106. Additionally, the server API 224 can provide the client API 222 by way of network 106 profiling data to display to the user in a GUI on the display device 108*a*. The user can access and evaluate the displayed profiling data. In some implementations, a guided mode can identify problem areas indicated by the profiling data. In some implementations, the profiling data can be stored as a profiling file in the database 104 in the computer system 114. In some implementations, the profiling data can be stored as a file in a file system included on the client 108. Storing of the profiling data can allow for subsequent retrieval and analysis.

The client 108 and the client 110 can connect to the computer system 114 by way of the network 106. In some implementations, the back-end profiler 212*b* can perform in compliance with both the client 108 and the client 110, simultaneously, while remaining multiple client compliant. The back-end profiler 212*b* can restrict profiling sessions to particular clients, while the server 102 can assign the current client information to its respective thread.

Figure 4:
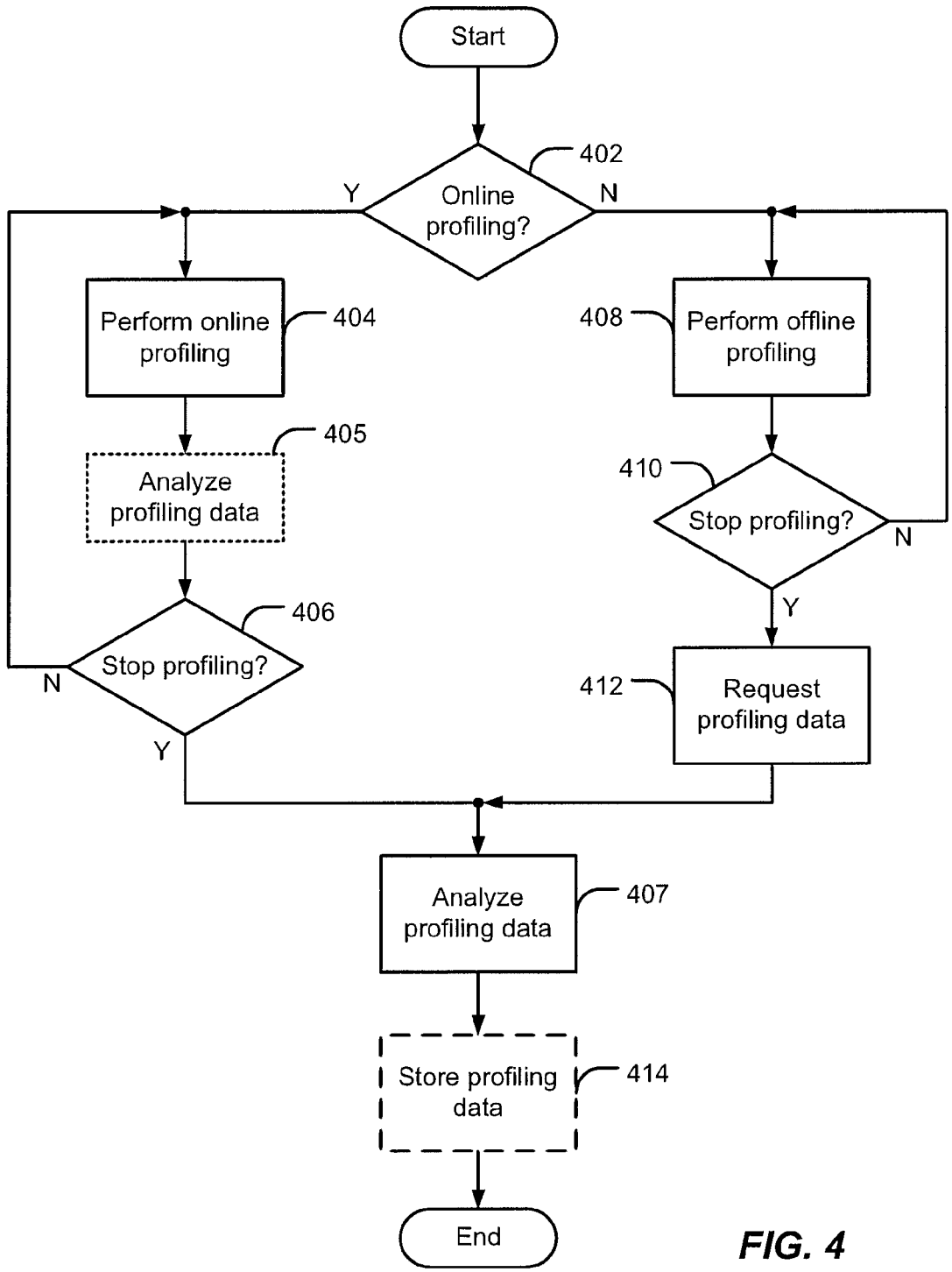
FIG. 4 is a flowchart illustrating exemplar steps that can be executed by a front-end profiler on a client for a profiling session.

FIG. 4 is a flowchart illustrating exemplar steps 400 that can be executed by a front-end profiler on a client (e.g., front-end profiler 212*a* on client 108 in FIG. 2) for a profiling session. In step 402, it is determined whether the profiling session will be an online (e.g., interactive mode) profiling session. If the profiling session is to be an online profiling session, interactive profiling is performed in step 404. The profiling data can be analyzed during the profiling session in optional step 405. The online profiling session continues until stopped. In step 406, it is determined whether the online profiling session is to be stopped. Whether the online profiling session is to be stopped can be determined based on a user input at the front-end. If the online profiling session is not to be stopped, the interactive profiling continues in step 404. If the online profiling session is to be stopped, the profiling data can be analyzed by the front-end profiler in step 407.

If, in step 402, if it is determined that the profiling session is not an online profiling session, offline (e.g., non-interactive) profiling is performed in step 408. The offline profiling session continues until stopped. In step 410, it is determined whether the offline profiling session is to be stopped. Whether the offline profiling session is to be stopped can be determined based on a user input at the front-end. If the offline profiling session is not to be stopped, the offline profiling session continues in step 408. If the offline profiling session is to be stopped, the front-end profiler requests the profiling data in step 412. In step 407, the profiling data can be analyzed by the front-end profiler. In step 414, which can be provided as an option, the profiling data can be stored locally in the client for future use by the front-end profiler (e.g., front-end profiler 212*a*).

In some implementations, a front-end profiler can provide a user with tools for analyzing profiling data (e.g., resource consumption information) gathered by a back-end profiler. The tools can be included in the front-end profiler. The tools can provide a GUI to the user (e.g., referring to FIGS. 1 and 2, a GUI can be displayed on display device 108*a*). The GUI can allow the user to select criteria for grouping and managing the profiling data in an efficient and meaningful way in order to simplify the analysis of the profiling data.

For example, the IDE of the software development platform (e.g., Eclipse) can be structured into a plurality of perspectives. As used herein, the term perspective refers to a visual container for a set of views and editors for the associated development task that can properly structure and arrange the views, and can be analogous to a page within a book, for example. Examples of perspectives can include, but are not limited to, a perspective for implementing a software application, a debug perspective for debugging functionality, a test perspective for implementing software application testing, and a profiler perspective for profiling functionality. The platform can associate a development task (e.g., source code implementation, debugging, testing, profiling) with a dedicated perspective. The development framework can provide an interface for combining user-made perspectives together with their related content. For example, the development framework can provide a GUI to display to a user on a display device that can combine a profiler perspective with profiling data.

The IDE of the software development platform (e.g., Eclipse) can provide the functionality to execute or debug a software application by providing one configuration framework for executing the application and another configuration framework for debugging the application. Both configuration frameworks can describe the selected application (e.g., a main class to start, start-up parameters, etc.). Another configuration framework can be included to profile an application, and provides a user interface framework that can start a profiling session.

In some implementations, multiple configuration framework types can be provided. Example configuration framework types can include an application configuration framework, a profiling file analysis configuration framework, and a remote profiling configuration framework. The application configuration framework can specify an application (e.g., a Java application) for profiling together with profiling parameters. For example, the application configuration framework can enable a user to execute an application with a profiling session already started. A user can profile the application directly from the start of execution of the application.

Figure 5:
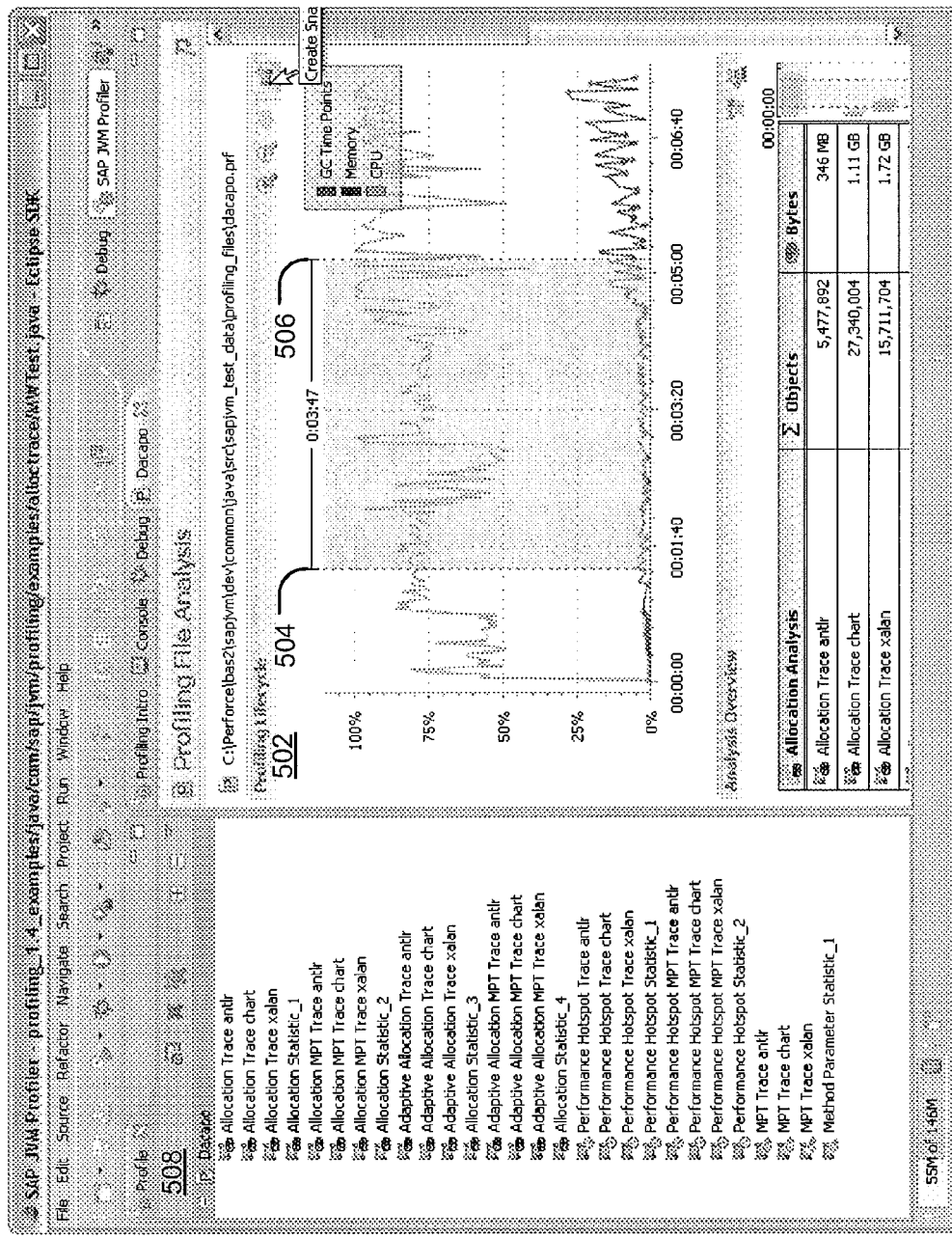
FIG. 5 is a screen-shot illustrating an exemplar profiler perspective for a VM.

Referring now to FIG. 5, a screen-shot 500 illustrates an exemplar profiler perspective for a VM. As described above, a development framework can provide a GUI to display to a user on a display device, as illustrated by the screen-shot of FIG. 5, for example, that can combine a profiler perspective with profiling data. The screen-shot of FIG. 5 illustrates a portion of an exemplar profiling lifecycle 502, for which a snapshot is provided between a starting point 504 (e.g., at 1 minute, 40 seconds) and an ending point 506 (e.g., at 5 minutes). The snapshot functionality is described in further detail below. The profiler perspective can include a profiler view 508 for a profiling session (e.g., the Example profiling session).

Referring again to FIG. 2, the profiling file analysis configuration framework can provide a user with a GUI on a display device (e.g., display device 108*a*) in order for the user to specify a profiling file for display. As previously described, a profiling file can include collected profiling data. The profiling file can be in a database on a server (e.g., database 104) or in a file system on a client (e.g., client 108). For example, the IDE can save profiling data from an interactive profiling session in a profiling file on the client that includes the IDE (e.g., client 108). For example, profiling data from a non-interactive profiling session can be saved in a profiling file included in a database (e.g., database 104) included on a server (e.g., server 102). For example, the front-end profiler 212*a* can provide the back-end profiler 212*b* specific profiling parameters that enable traces to begin directly on the start-up of the application for profiling in the back-end VM 218. The profiling data can be stored in a profiling file on database 104. A user on a client (e.g., client 108) can view the profiling file on a display device (e.g., display device 108*a*) by generating a profiling file analysis configuration framework.

With further reference to FIG. 2, the remote profiling configuration framework can allow a user to specify a connection (e.g., a host name and port number) to the VM (e.g., back-end VM 218) for profiling. For example, as previously described, a back-end profiler (e.g., back-end profiler 212*b*) can open a debugging port to a back-end VM (e.g., back-end VM 218) when a front-end profiler (e.g., front-end profiler 212*a*) initiates an online profiling session with the back-end profiler (e.g., back-end profiler 212*b*).

Figure 6:
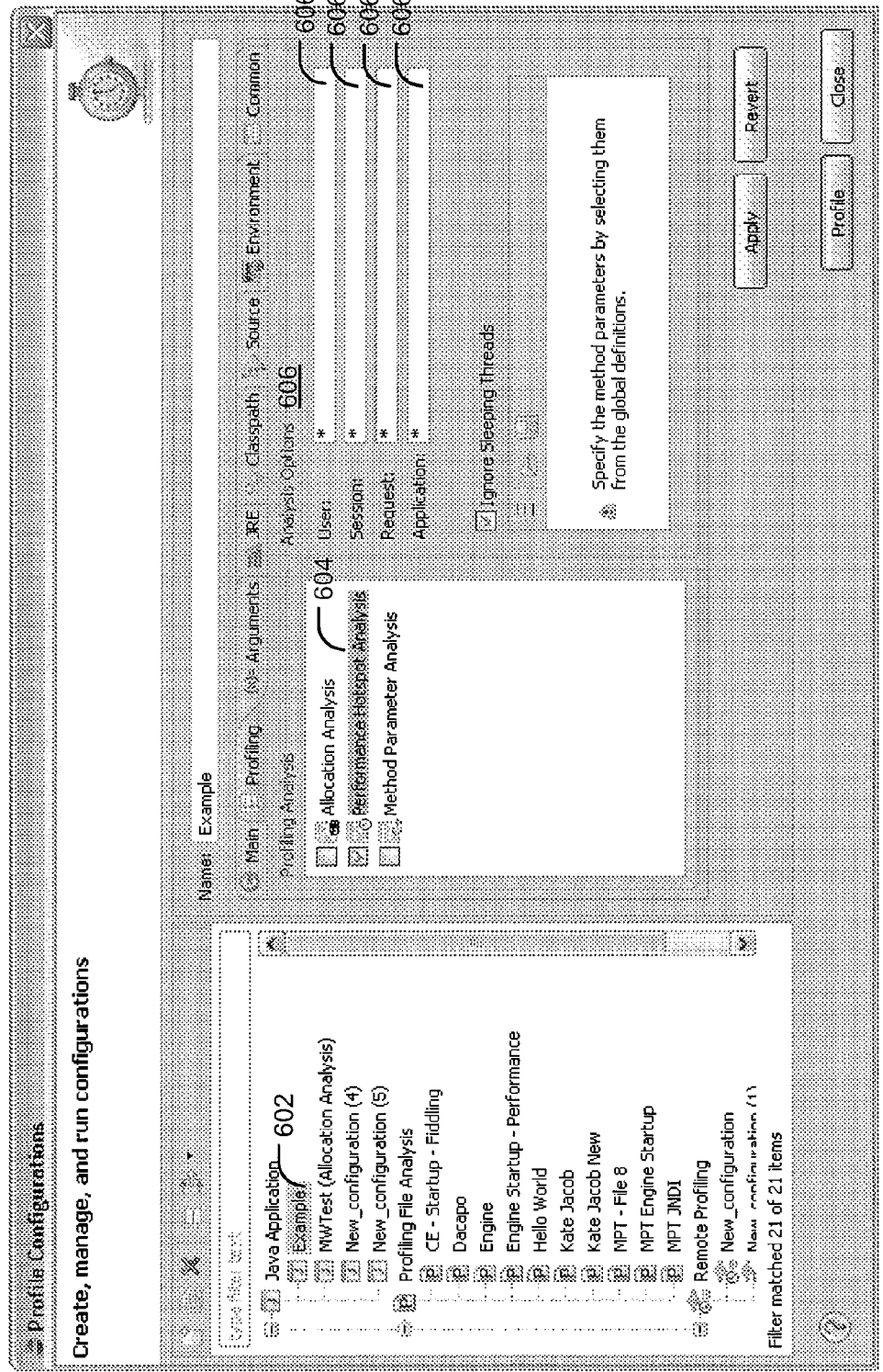
FIG. 6 is a screen-shot illustrating an exemplar graphical user interface (GUI) used to configure a profiler and start a profiling session.

Referring now to FIG. 6, a screen-shot 600 illustrates an exemplar GUI that can be used to configure a profiler and start a profiling session. For example, and with co-reference to FIG. 2, a user can select to profile an application (e.g., Java application: Example 602) running on the back-end VM 218 using back-end profiler 212*b*. The user can select to analyze the performance behavior of the application (e.g., the user can select Performance Hotspot Analysis 604). The performance behavior of the application can involve method calls and execution paths, which can consume the majority of the CPU resources. The profiling data can include the method calls and execution paths used by the application. In order to profile the application, a user can create an application configuration framework in an IDE running on a client (e.g., client 108). As described, the application configuration framework can allow the user to execute the application with a profiling session already started. The user can profile the application directly from the start of execution of the application. Within the application configuration framework, a user can specify a class containing the main method of the application and enable a performance hotspot analysis profiling trace. The performance hotspot analysis profiling trace can provide the user with information that can indicate performance hotspots within the application.

Analysis options 606 can include information such as a user name or identifier option 606a, a session name or identifier option 606b, a request name or identifier option 606c and an application name or identifier option 606d. For example, the analysis options 606 can indicate the user, session, requester or application that can start a profiling session. A server (e.g., server 102) can tag one or more threads running on a VM (e.g., back-end VM 218) with the analysis options 606. When a profiling session is started (e.g., a user on client 108 interfaces with a GUI on display device 108a to enable the front-end profiler 212a to initiate a profiling session), a thread filer (e.g., thread filter 304 in FIG. 3) included in the a back-end profiler (e.g., back-end profiler 212b) can process the analysis options 606. The thread filter (e.g., thread filter 304) and the back-end profiler (e.g., back-end profiler 212b) can determine, for example, if the user name or identifier option 606a matches the user of the client 108.

In some implementations, the analysis options 606 can be alphanumeric names associated with each option (e.g., options 606a-d). In some implementations, an abbreviated numeric identifier can be used for each option (e.g., options 606a-d) where each abbreviated numeric entry corresponds to a longer alphanumeric entry for the options 606a-d.

Referring again to FIG. 2, once a server (e.g., server 102) begins the execution of an application in a VM (e.g., back-end VM 218), a back-end profiler (e.g., back-end profiler 212b) can monitor at regular intervals what the application is executing. For example, back-end profiler 212b can record profiling data that includes a complete stack trace for all threads running in the application on the back-end VM 218. The server API 224 by way of network 106 and client API 222 can transfer the profiling data to the front-end profiler 212a. For example, in order to obtain an accurate view of the performance behavior of the application, the back-end profiler 212b can perform and record a stack trace computation every ten milliseconds. This can result in the back-end profiler 212b recording and transferring a large amount of profiling data to the front-end profiler 212a especially when the application is large and executes for a prolonged period.

In some implementations, the front-end profiler 212a can maintain profiling data it receives in main memory on the client 108. In some implementations, if the front-end profiler 212a receives a large amount of profiling data compared to the available amount of main memory on the client 108, the front-end profiler 212a may store the profiling data in a file on the file system of the client 108. In this case, some statistical or aggregated profiling data values (e.g., the profiling session duration time) may be presented to the user on a real-time basis in a dedicated profile view (e.g., profile view 508 in FIG. 5) included in the IDE of the software development environment on the client 108. The remaining profiling data can be stored in a file on the file system of the client 108 for later viewing and analysis by the user in a GUI on display device 108a.

Figure 7:
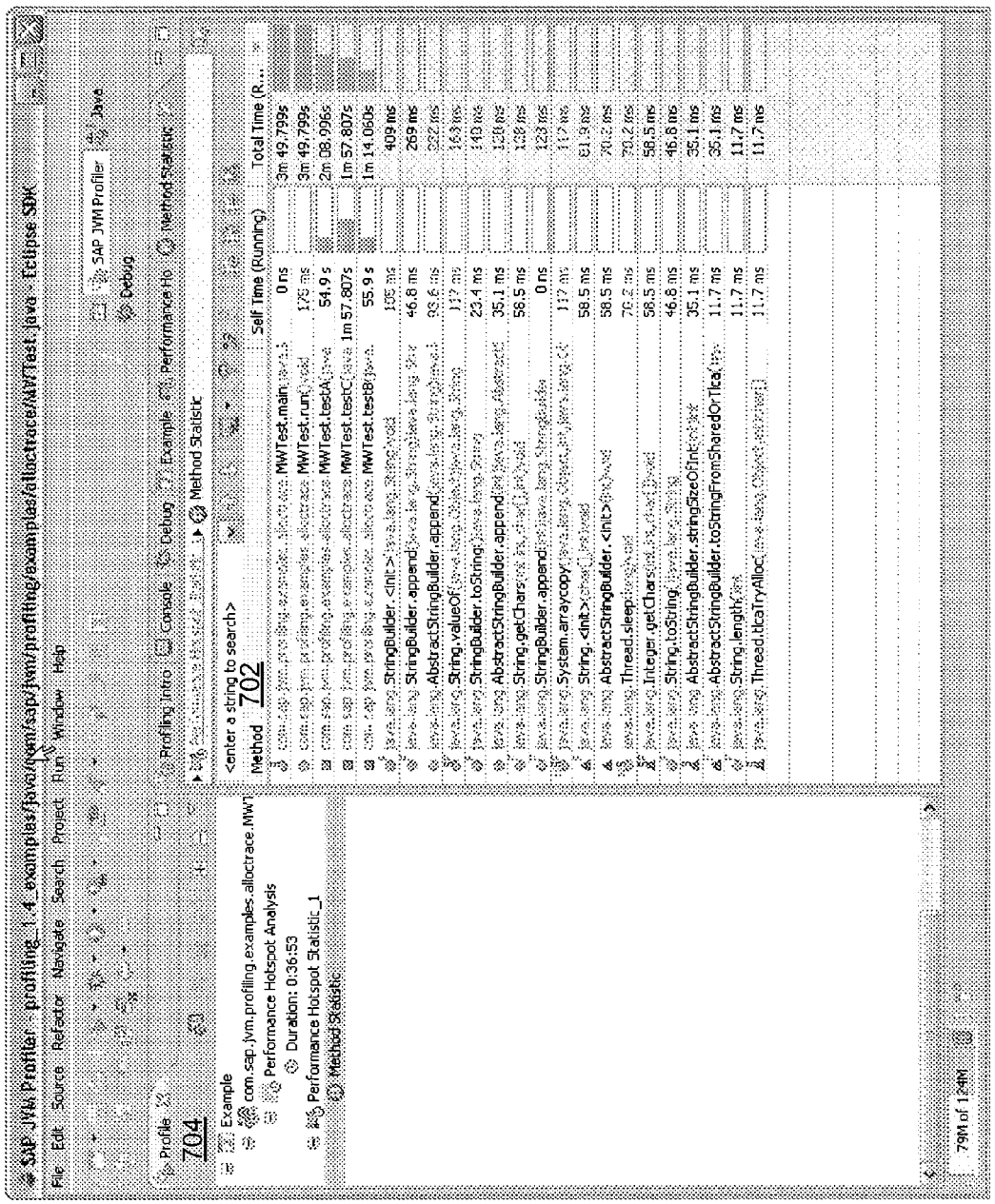
FIG. 7 is a screen-shot illustrating an exemplar method statistic view included in a profiler perspective.

Referring now to FIG. 7, a screen-shot 700 illustrates an exemplar method statistic view 702 included in a profiler perspective. The method statistic view 702 can be used to identify performance hotspots, and provides an overview of the methods that consume the most CPU resources of an application. As described above, a performance hotspot analysis can dump a stack trace of the currently active threads at regular intervals (e.g., every 10 milliseconds). For each method, the front-end profiler (e.g., front-end profiler 212a) can calculate the percentage of how often a method appears on the top of the stack trace. This percentage can be the self-time for the method. The front-end profiler (e.g., front-end profiler 212a) can use the method self-time to estimate the amount of time the application spends processing the method. Additionally, for each method, the front-end profiler (e.g., front-end profiler 212a) can calculate the percentage of how often a method appears at any location in the stack trace. This percentage can be the total time for the method and can denote the amount of time the application spends processing the method, which includes any calls the method made to other methods.

In the example of FIG. 7, a user can select a called methods (hierarchical) entry point. A profiler perspective on a front-end profiler (e.g., front-end profiler 212a) can open the method statistic view 702. The method statistic view 702 can include a hierarchical list of methods called during the snap-shot of the performance analysis (e.g., a method statistic of a performance hotspot statistic). The method statistic view 702 can list the called methods based on the total run time of each of the called methods during the snapshot of the performance analysis.

For example, a profiler can create a statistic view for each entry point. The profiler can determine the statistics for display in the statistic view by parsing original profiling data included in a profiling file. For example, a profiling file can be stored on a file system of a client (e.g., client 108) running a front-end profiler (e.g., front-end profiler 212a). A front-end profiler (e.g., front-end profiler 212a) can parse original profiling data in the profiling file, determine requested data for display in a statistic view based on the entry point for the snapshot, and provide the requested data for the statistic view. The requested data for the statistic view can be stored in main memory for use by the front-end profiler (e.g., front-end profiler 212a) and can be stored in a file on the file system. When the front-end profiler (e.g., front-end profiler 212a) closes the statistic view, the front-end profiler (e.g., front-end profiler 212a) can delete the profiling data for the statistic view from the main memory of the client, leaving the stored data for the statistic view in a file on the file system. If the front-end profiler (e.g., front-end profiler 212a) reopens the statistic view, the front-end profiler (e.g., front-end profiler 212a) can read the data for the statistic view from the stored file without the need to parse the original profiling file.

For example, original profiling data received by a front-end profiler (e.g., front-end profiler 212a) from a back-end profiler (e.g., back-end profiler 212b) can include stack trace information for all threads running on a VM (e.g., back-end VM 218). The back-end profiler (e.g., back-end profiler 212b) can sample and record the stack thread information for a stack trace at pre-defined intervals (e.g., every 10 msecs). More specifically, a stack trace includes several stack frames, each stack frame including the individual methods and corresponding line numbers. When the states of the threads are sampled, a complete stack trace is determined for each individual thread. This occurs at the pre-defined interval (e.g., every 10 msecs) depending on the underlying operating system. In order to determine the runtimes of the individual methods, the pre-defined interval is accounted to each stack frame (e.g., the actual method and corresponding line number) of a stack trace. More specifically, the runtime of a method is separated into a self time and a total time. The self time indicates the time spent directly within a specific method, whereas the total time indicates the time spent within a specific method plus the time spent in called methods. Accordingly, if a sampled stack trace is determined, the pre-defined interval (e.g., every 10 msecs) is accounted to the total runtimes of each individual stack frame. The method at the top of the stack trace includes the pre-defined interval added to its self time.

The above-described process can be time consuming dependent on the amount of profiling data. The amount of profiling data can depend on the size of the application running on the VM (e.g., back-end VM 218) along with the amount of time the application is running while being profiled. However, the amount of memory required for storing the resultant method statistic can be significantly smaller than the amount of memory required for storing the original profiling data.

The original profiling data provides the complete stack trace for each individual thread. The method statistic can include aggregated data from the original profiling data. The method statistic can provide an overview of the total runtime for each method. Referring again to FIG. 7, an examplar method statistic view 702 in a profiler perspective is shown. For example, a front-end profiler (e.g., front-end profiler 212*a*) can display to a user the method statistic view 702 on a display device (e.g., display device 108*a*) on a client (e.g., client 108). The front-end profiler (e.g., front-end profiler 212*a*) can store the aggregated data of the method statistic in main memory to a file located on the client (e.g., client 108). When the user closes the method statistic view 702, the aggregated data of the method statistic can be removed from main memory on the client (e.g., client 108) but can still remain on the client (e.g., client 108) in a file on the file system of the client (e.g., client 108). When the user selects the method statistic entry point, the front-end profiler (e.g., front-end profiler 212*a*) can display the method statistic view 702 on the display device (e.g., display device 108*a*) to the user. The front-end profiler (e.g., front-end profiler 212*a*) can obtain the aggregated data of the method statistic from the stored file on the file system of the client (e.g., client 108) without the need to recreate the method statistic from the data included in the original profiling file. This can save the front-end profiler (e.g., front-end profiler 212*a*) a significant amount of processing time.

In some implementations, the front-end profiler (e.g., front-end profiler 212*a*) can store the aggregated data for the method statistic along with the method statistic view. Storing the method statistic view can include storing the last state of the view prior to the user closing the view (e.g., storing the sort directions, the selection state, the expanded state of trees, etc.). When the user selects the method statistic entry point, the front-end profiler (e.g., front-end profiler 212*a*) can display the method statistic view (e.g., method statistic view 702) on the display device (e.g., display device 108*a*) to the user in the state that the view was in when the user previously closed the view.

In some implementations, a front-end profiler (e.g., front-end profiler 212*a*) can store profiling data for a profiling session in a file system on a client (e.g., client 108). When a user closes the IDE of the software development platform (e.g., Eclipse), the profiling data can remain in the file on the file system. Additionally, the state of the IDE when closed can also be saved. When the user reopens the IDE, the complete state of the GUI for the IDE can be restored (e.g., profiling sessions, opened views, view states, available statistics, etc.) along with the profiling data for the profiling session.

Figure 8:
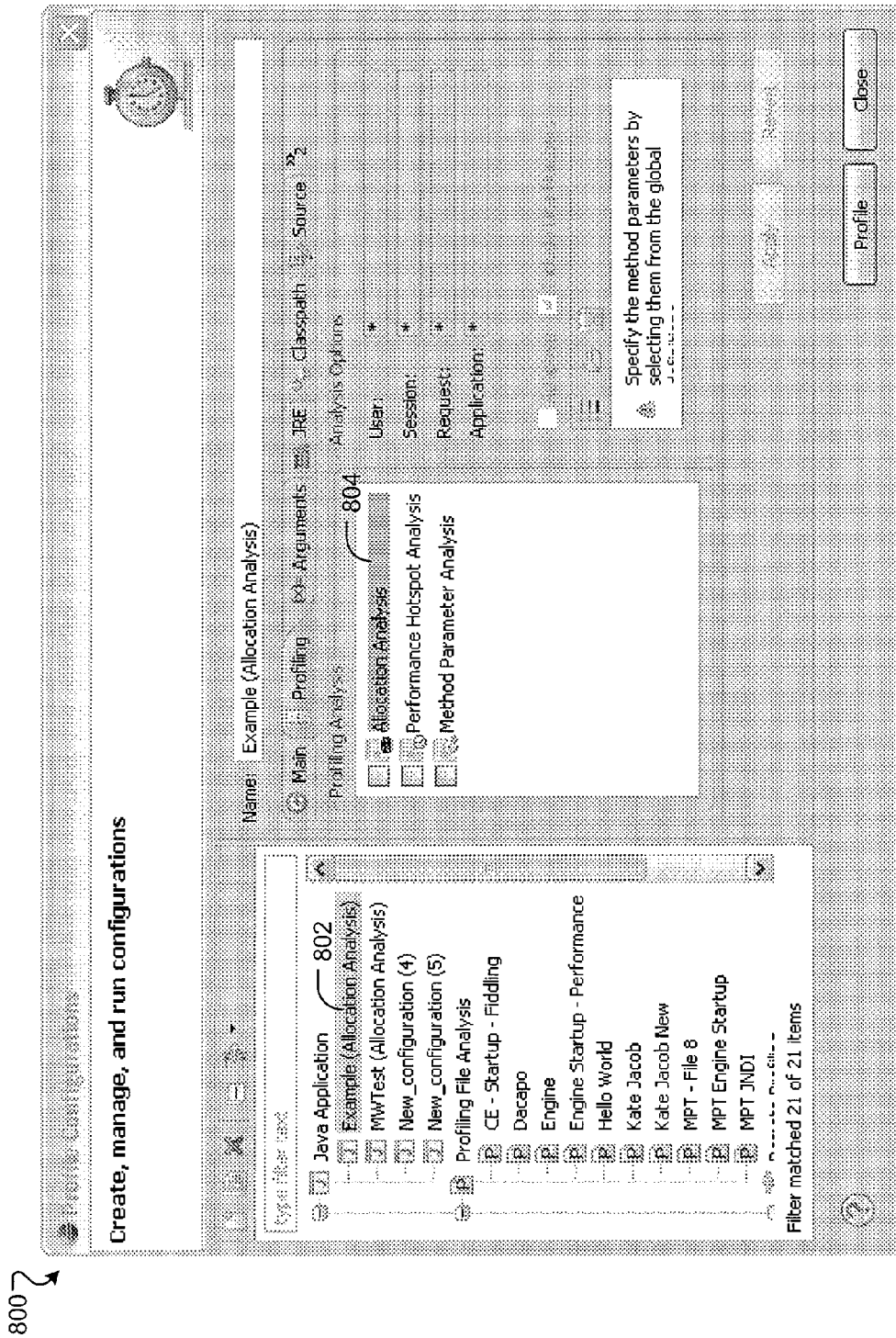
FIG. 8 is a screen-shot illustrating an exemplar GUI used to configure a profiler and start an alternative profiling session.

Referring now to FIG. 8, a screen-shot 800 illustrates an exemplar graphical user interface (GUI) used to configure a profiler and start an alternative profiling session. For example, and with co-reference to FIG. 2, a user can select to profile an application (e.g., Java application: Example 802) running on the back-end VM 218 using back-end profiler 212*b*. The user can select to analyze application execution to identify memory related problems (e.g., the user can select Allocation Analysis 804). In order to profile the application, the user can create an application configuration framework in an IDE running on a client (e.g. client 108). As described, the application configuration framework can allow the user to execute the application with a profiling session already started. The user can profile the application directly from the start of execution of the application. Within the application configuration framework, a user can specify a class containing the main method of the application and enable an allocation analysis profiling trace. The allocation analysis profiling trace can provide the user with information related to the memory consumption by the application.

Referring now to FIG. 9, a screen-shot 900 illustrates an alternative exemplar method statistic view 902 included in a profiler perspective is shown. Once the profiling session is complete, a user can select a view for a method statistic. A profiler perspective on a front-end profiler (e.g., front-end profiler 212*a*) can open the method statistic view 902. The method statistic view 902 can display the methods in an application that performed memory allocations during the profiling session.

In some implementations, a profiler perspective can present a plurality of views to a user. Each view can include specific statistics about a profiling session. A front-end profiler (e.g., front-end profiler 212*a*) can uniquely identify and describe the statistics in the view. The unique identification of the statistics can allow a user to navigate from one statistic to other statistics.

For example, using an arbitrary number of navigation steps, a user can start at a first statistic in a first view. The front-end profiler (e.g., front-end profiler 212*a*) can generate the first statistic from a first set of first profiling events identified in the profiling data. The user can select an arbitrary number of displayed entries for the first statistic from the first view. The user can navigate to a second statistic in a second view. The front-end profiler (e.g., front-end profiler 212*a*) can generate the second statistic for the second view from a second set of second profiling events. The second set of second profiling events can include the first profiling events minus the constraints introduced by the selection of the items from the first statistic in the first view. A user can continue to select an arbitrary number of displayed entries from one view and navigate to a next view. The front-end profiler (e.g., front-end profiler 212*a*) can efficiently describe the statistic for each view in an abstract and unique manner to reflect the path to the statistic.

In some implementations, a resource name can uniquely describe a statistic for a profiler in an abstract manner. The resource name can include one or more resource name elements. A resource name element can describe a constraint or filter used to determine the set of profiling events.

For example, a profiling session can produce profiling data that refers to memory allocation events. The front-end profiler (e.g., front-end profiler 212a) can generate a method statistic from a first set of first profiling events identified in the profiling data. A view for the method statistic can display to a user all methods in which memory allocations occurred. FIG. 9 shows an exemplar method statistic view 902. The front-end profiler (e.g., front-end profiler 212a) can apply a type of filter to the profiling data that filters out all methods in which memory allocations occurred. The resource name for the method statistic can include a single resource name element (e.g., "Method Statistic"). The user can select a method from the method statistic view (e.g., java.util.AbstractList.Iterator ()) and navigate to a view for an allocated object statistic for the selected method. The allocated object statistic view can show the type (e.g., class) of allocated objects created by the selected method as well as allocated objects created by one or more methods called from the selected method. The resource name for the allocated object statistic can include the resource name elements of the parent statistic plus additional resource name elements. For example, the resource name for the allocated object statistic can include the resource name element for the method statistic (e.g., "Method Statistic"), a filter resource name element for the selected methods (e.g., "java.util.AbstractList.Iterator()"), and a resource name element for the allocated object statistic (e.g., "Allocated Object Statistic").

The user can select one or more allocated object types from the allocated object statistic view (e.g., allocated objects for string functions) and navigate to a view for a thread statistic. The thread statistic view can show the threads where the objects selected from the allocated object statistic are allocated. For example, the resource name for the thread statistic can begin with the resource name elements of the parent statistic (the view that the user selections originated from (e.g., the allocated object statistic)). Additionally, a filter resource name element for the allocated object statistic (e.g., "String Functions") and a resource name element for the thread statistic (e.g., "Thread Statistic")) can be appended to the resource name elements of the parent statistic.

As shown in the above examples, a naming scheme for a resource name can directly reflect the navigation steps of the user (e.g., resource name: Method Statistic_java.util.AbstractList.Iterator()_Allocated Object Statistic_String Functions_Thread Statistic). The resource name can uniquely describe a statistic. For example, a user can compare profiling statistics by comparing the resource elements in their resource names. In this manner, a user can identify identical profiling statistics.

For example, a front-end profiler (e.g., front-end profiler 212a) can create a third profiling statistic from a selection within a second profiling statistic where the second profiling statistic was created by a selection from within a first profiling statistic. In some implementations, the front-end profiler (e.g., front-end profiler 212a) can create the third profiling statistic by starting with the original profiling data and creating the first profiling statistic by applying a first filter for the first profiling statistic to the original profiling data. Applying the first filter for the first profiling statistic to the original profiling data can filter out profiling events in the original profiling data that do not meet the requirement for selection for the first profiling statistic. This results in a first set of profiling events. The front-end profiler (e.g., front-end profiler 212a) can create a second profiling statistic from the first profiling statistic by applying a second filter for the second profiling statistic to the first set of profiling events resulting in a second set of profiling events. The front-end profiler (e.g., front-end profiler 212a) can create the third profiling statistic from the second profiling statistic by applying a third filter for the third profiling statistic to the second set of profiling events resulting in a third set of profiling events. If a user chooses a navigation depth through the profiling data of n times, the profiling data and resultant profiling events are parsed n times. This can consume a large amount of system resources.

In some implementations, a software component for creating profiling statistics can be included in a front-end profiler (e.g., front-end profiler 212a). The profiling statistic creator software component can parse a resource name to compute the filter constraints used to create a view for a statistic described by the resource name. For example, a resource name can include one or more resource name elements for filtering threads. The profiling statistic creator software component can parse the resource name, extract all filter elements from the resource name and create a single thread filter. Additionally, the profiling statistic creator software component can parse the resource name and group resource name elements of the same type to create a single filter. In this case, if a user has chosen a navigation depth through the profiling data of n times, the profiling statistic creator software component can parse the profiling events once, check each profiling event and determine if all of the filter types apply to the profiling event. Additionally, the profiling statistic creator software component can group resource name elements of the same type to create a single filter for each type in order to create the profiling statistic.

In some implementations, a JVM profiler can profile a Java application running on a local or remote host. Within a remote profiling session, a user can directly connect to the JVM. The user can interactively configure the profiling session and request profiling data. For example, the user can request a class statistic and directly see a view of the class statistic on a display device on the local host that includes a front-end profiler (which can be a plug-in to a software development environment (e.g., Eclipse)). As previously described, the profiling events for a statistic can be used as an input for additional requests for statistics.

Referring again to FIG. 2, a front-end profiler (e.g., front-end profiler 212a) can include functionality to analyze the total collected profiling data as a whole. In some implementations, a user may want to analyze certain regions or parts of the total profiling data. For example, a profiling session can collect profiling data for a number of hours (e.g., 24 hours). Over the profiling session, the application can execute in a number of phases. By way of one non-limiting example, a first portion of the session can include an initialization phase (e.g., during the initialization phase, a Java Just-In-Compiler compiles "hot" classes, and application caches were loaded). During the analysis of the total profiling data, a user may note that within an initial time period (e.g., the first three hours) of profiling data collection, the application appears to be in the initialization phase. It may be desirable to separate the profiling data related to the initialization phase, for example, from the remaining profiling data and to analyze the separated data apart from the total profiling data.

By way of another non-limiting example, a profiling session can collect profiling data for an entire application server system that may include a plurality of different, concurrently executing applications. During the analysis of the profiling data, a user may want to separate the collected profiling data according to each of the different applications and to analyze the data for each application in an independent manner.

In some implementations, the present disclosure enables a user can create a snapshot, or a sub-region of profiling data, to analyze a subset of the total collected profiling data independent of the total collected profiling data. A snapshot can be a specific timeframe or interval where profiling data was collected. In some implementations, the sub-region can be defined based on a time condition (e.g., the profiling data for a snapshot can be with a specific time interval). In some implementations, the sub-region can be defined based on logical boundaries (e.g., the profiling data for a snapshot can be for a certain application, thread, Java class, and/or user). A user can separate total collected profiling data into a plurality of different snapshots. Additionally, a snapshot can include logical filter definitions. For example, the logical filter definitions can apply to selected classes, methods, threads, applications, users, or execution paths included in the profiled application.

For example, an application for profiling may include several individual steps (e.g., a web application that includes a plurality of individual dialog steps). A user can create a plurality of snapshots during an online profiling session for each individual step (e.g., each dialog step) performed. For example, a user can create a snapshot within a front-end profiler (e.g., front-end profiler 212a). The front-end profiler (e.g., front-end profiler 212a) can send a snapshot command (e.g., a snapshot marker) to the back-end profiler (e.g., back-end profiler 212b). The back-end profiler (e.g., back-end profiler 212b) can receive the snapshot command and place the snapshot command in the actual profiling event stream to the front-end profiler (e.g., front-end profiler 212a). Therefore, the back-end profiler (e.g., back-end profiler 212b) can interleave snapshot commands (e.g., snapshot markers) with actual profiling events. Snapshot commands can include a snapshot marker that indicates the starting point of the snapshot and a snapshot marker that indicates the ending point of the snapshot. The front-end profiler (e.g., front-end profiler 212a) can filter all events from the total collected profiling data sent by the back-end profiler (e.g., back-end profiler 212b) which belong to a particular snapshot. The front-end profiler (e.g., front-end profiler 212a) can perform the filtering by including the profiling events that occur between two snapshot markers in the profiling data for the snapshot.

In some cases, profiling data may not be directly associated with time information. For example, a profiling session can be an allocation session for analyzing the memory behavior of an application. The back-end profiler (e.g., back-end profiler 212b) can provide profiling data that includes information about object allocation events. In order to facilitate the creation of snapshots for certain arbitrary timeframes, the profiling data must contain time information. Although, it is possible to add time information to each individual profiling event (e.g., such as an allocation event), the resource consumption to insert this time information would be very high.

Accordingly, implementations of the present disclosure can introduce intermittent reporting events to be included with the profiling data. In general, a status report that reports the status of the back-end application is intermittently generated at each reporting event based on a user-defined report interval. For example, the back-end profiler (e.g., back-end profiler 212b) generate one or more status reports in the profiling data. A user can configure a report interval prior to starting a profiling session. More specifically, the GUI displayed on the display device 108a for the front-end profiler 212a can enable the user to indicate that reporting events are to be generated, and to select a reporting interval. For example, the user can configure a two second reporting interval for a profiling session, which instructs the back-end profiler (e.g., back-end profiler 212b) to generate a status report every two seconds and include the status report in the profiling data. The status report can include, but is not limited to, the CPU load of the system, the number of performed garbage collections, and/or a time stamp. More specifically, the reporting events that include time information can be introduced among the actual profiling events.

By way of non-limiting example, a user can create a snapshot within a front-end profiler (e.g., front-end profiler 212a) for a time period between points A and B. The front-end profiler (e.g., front-end profiler 212a) can send snapshot commands (e.g., snapshot markers) to the back-end profiler (e.g., back-end profiler 212b). The back-end profiler (e.g., front-end profiler 212b) can determine the two reporting events that are closest to point A and point B, respectively. The back-end profiler (e.g., back-end profiler 212b) can receive the snapshot markers and place the snapshot markers in the actual profiling event stream to the front-end profiler (e.g., front-end profiler 212a). The front-end profiler (e.g., front-end profiler 212a) can filter all events from the collected profiling data sent by the back-end profiler (e.g., back-end profiler 212b). The front-end profiler (e.g., front-end profiler 212a) can perform the filtering and generate a snapshot view that includes the profiling events that occur between the two snapshot markers in the profiling data for the snapshot.

In some implementations, a user may want to analyze total collected profiling data for a profiling session for a particular thread (e.g., thread X). For example, the user may want to analyze object allocations performed by the particular thread throughout the total collected profiling data. A front-end profiler (e.g., front-end profiler 212a) can create a logical filter to determine if a profiling event included in the total collected profiling data is of interest. The front-end profiler (e.g., front-end profiler 212a) can parse the total collected profiling data and create a snapshot that includes the profiling events of interest. The logical filter settings can determine the criteria (e.g., object allocations performed by thread X) a profiling event must meet in order to be included in the snapshot. The front-end profiler (e.g., front-end profiler 212a) can create the snapshot for a selected time (e.g., the total time of the profiling session) and filter entity (e.g., object allocations performed by thread X).

In some implementations, a sub-snapshot can be generated (e.g., a sub-region within a sub-region, or a snapshot within a snapshot). A user can create a hierarchy of snapshots to drill down to information of interest within the profiling data. The criteria for a sub-snapshot included in a snapshot hierarchy can be a combination of time based and event based criteria.

For example, a user can create a snapshot by selecting a corresponding entry within a context menu of a profiling trace entry in a profile view. Referring again to FIG. 5, a user can select a snapshot within in the profiling lifecycle 502 starting at starting point 504 (e.g., at 1 minute, 40 seconds) and ending at ending point 506 (e.g., at 5 minutes). In some implementations, a user can create a plurality of different snapshots to select profiling data for the profiling session at different time spans.

Once the user selects the starting and ending points (the timeframe or interval) for the snapshot, the profiler perspective can open a new view that includes entry points (e.g., called methods (flat), called methods (hierarchical), threads, users, sessions, requests, applications) into a detailed analysis for the snapshot. When the user selects an entry point, the profiler perspective can open a new view that includes the statistics for the selected entry point. Entry points can include, but are not limited to, statistics for called methods or threads, and statistics on users, sessions, requests or applications. Statistics for called methods can include statistics on called methods during a performance analysis. A view for the called method statistics can use a flat list for the called methods. An alternate view for the called method statistics can list the method calls in a hierarchy. Statistics on threads called during a performance analysis can list the threads in a view by their thread IDs. Additional views can display statistics on users during the performance analysis, statistics on sessions during the performance analysis, statistics on requests during the performance analysis and additional statistics related to the application during the performance analysis.

Figure 10:
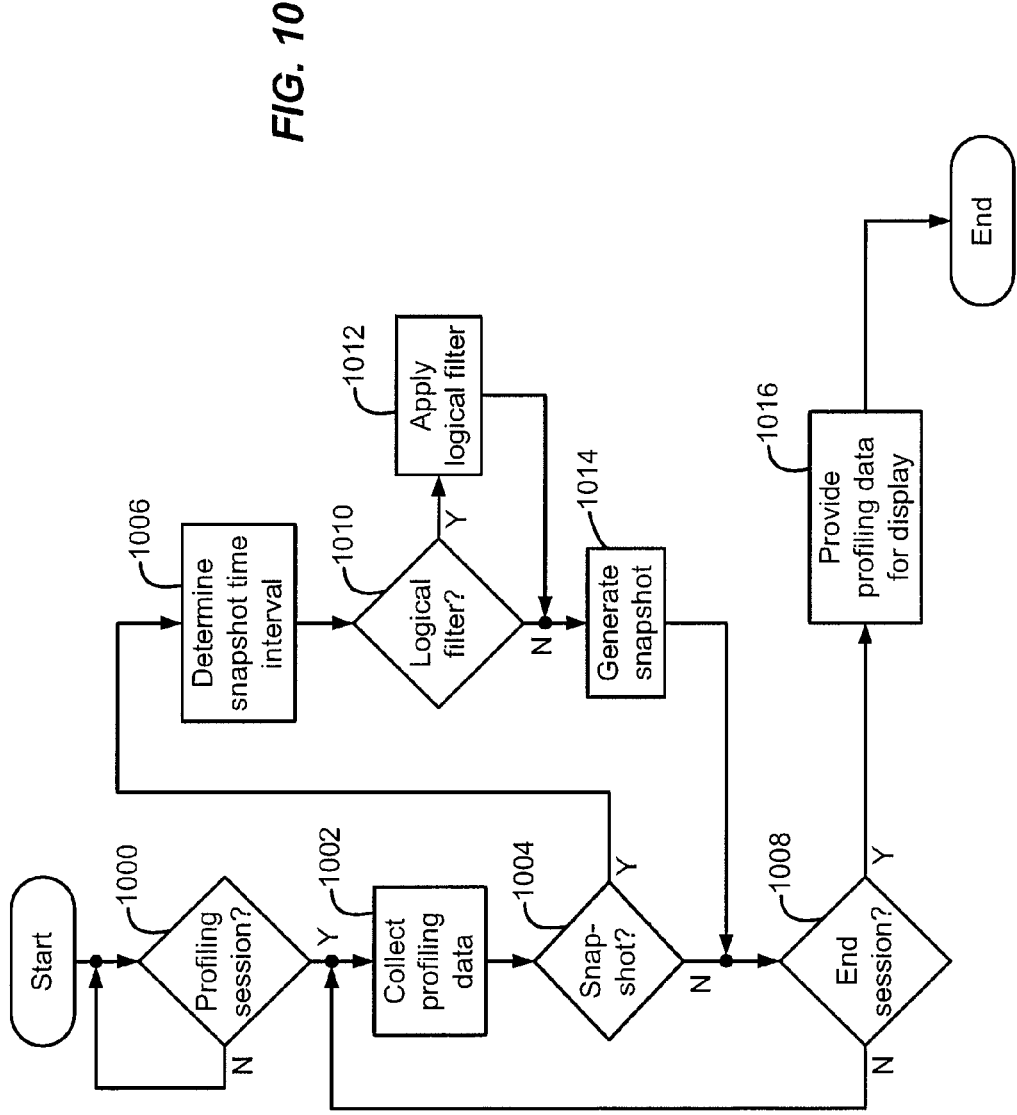
FIG. 10 is a flowchart illustrating exemplar steps that can be executed in accordance with implementations of the present disclosure.

Referring now to FIG. 10, exemplar steps that can be executed in accordance with implementations of the present disclosure will be described. The exemplar steps of FIG. 10 can be executed using one or more processors coupled to a computer-readable storage medium at a computer system (e.g., the computer system 114 including server 102) and/or a client device (e.g., the client devices 108, 110). In step 1000, it is determined whether a profiling session is to be initiated. For example, a server can determine whether a profiling session is to be initiated based on user input received from a client device. If a profiling session is not to be initiated, the steps loop back. If a profiling session is to be initiated, one or more to-be-profiled applications are executed using a back-end VM and profiling data is collected in step 1002. In step 1004, it is determined whether a snapshot of the profiling data is to be generated. In the context of the exemplar steps of FIG. 11, the snapshot can be generated while the profiling session is in progress. It is contemplated, however, that snapshots can be generated after the profiling session has ended. If a snapshot is to be generated, the steps continue in step 1006. If a snapshot is not to be generated, the steps continue in step 1008.

In step 1006, a snapshot time interval is determined. As discussed in detail above, the snapshot time interval can be determined based on user input indicating first and second snapshot markers. As also discussed in detail above, the snapshot time interval can be determined based a report interval that indicates a frequency for generating a status report, and times corresponding to subsequently generated status reports. This functionality can be executed by the server, for example, based on user input provided from the client device. In step 1010, it is determined whether a logical filter is to be applied to the profiling data within the snapshot time interval. This functionality can be executed by the server, for example, based on user input provided from the client device. If a logical filter is to be applied, the steps continue in step 1012. If a logical filter is not to be applied, the steps continue in step 1014. In step 1012, one or more logical filters are applied. In step 1014 the snapshot is generated.

In step 1008, it is determined whether the session is to be ended. This can be determined by the server, for example, based on user input received from the client device. If the session is not to be ended, the steps loop back to step 1002. If the session is to be ended, execution of the application ceases and the profiling session ends. The profiling data is provided for display in step 1016, and the steps end. For example, the server can transmit the profiling data to the client device for display to the user. The transmitted profiling data can include only the profiling data corresponding to one or more snapshots generated during the profiling session. In some implementations, the entire profiling data can be provided to the client device, and the user can determine which profiling data to display.

Figure 11:
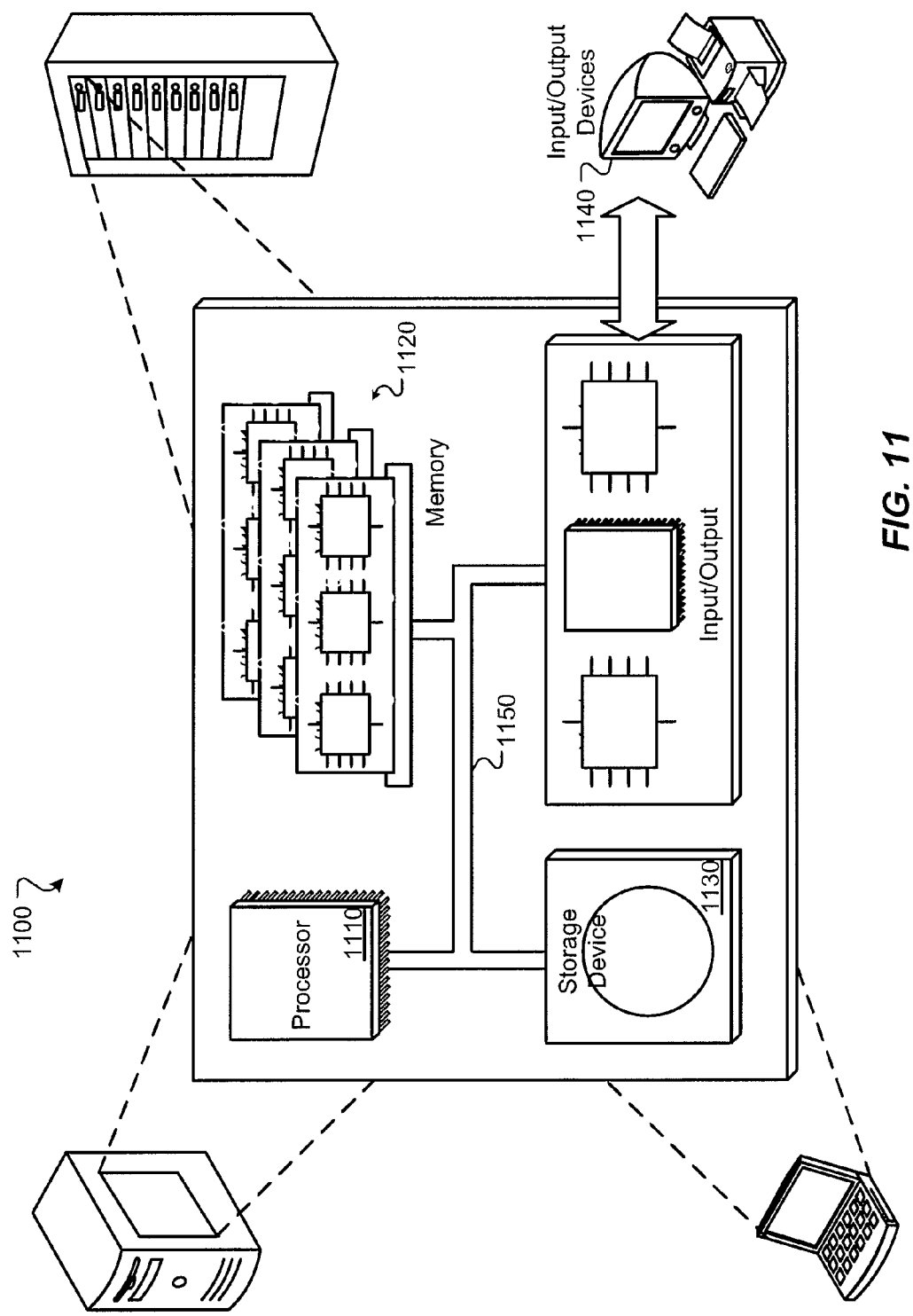
FIG. 11 is a schematic illustration of exemplar computer systems that can be used to execute implementations of the present disclosure.

Referring now to FIG. 11, a schematic illustration of exemplar hardware components 1100 that can be used to execute implementations of the present disclosure is provided. The system 1100 can be used for the operations described in association with the methods described in accordance with implementations of the present disclosure. For example, the system 1100 may be included in the application server 102. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device. The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
    executing a profiling session to profile one or more applications running on a virtual machine executed on a server;
    collecting profiling data over a first time interval during the profiling session;
    receiving user input generated at a client device, the client device being in communication with the server, the user input being received during the profiling session;
    in response to the user input, generating, by the server, a first snapshot marker within the profiling data based on the user input, generating a second snapshot marker within the profiling data, wherein a second time interval is defined between the first and second snapshot markers, and generating a snapshot corresponding to a subset of the profiling data, the snapshot being generated during the profiling session and being identified based on the second time interval that is within the first time interval;
    transmitting, from the server and to the client device, only the subset of the profiling data to generate a snapshot view for display on the client device, the snapshot view corresponding to the subset of the profiling data; and
    receiving, by the server, a user selection of a called methods entry point, and in response, providing a list of methods called during the snapshot.

2. The computer-implemented method of claim 1, further comprising receiving user input indicating one or more logical filter definitions, wherein the snapshot is generated based on the one or more logical filter definitions.

3. The computer-implemented method of claim 2, wherein the one or more logical filter definitions comprise one or more of a class name, a method name, a thread name, an application name, a user name, and an execution path.

4. The computer-implemented method of claim 1, further comprising receiving second user input during running of the application, wherein the second snapshot marker is generated based on the second user input.

5. The computer-implemented method of claim 1, further comprising:
    determining a report interval, the report interval indicating a frequency for generating a status report of an application;
    generating a plurality of status reports based on the report interval, wherein each status report and a corresponding time are provided in the profiling data; and
    determining the second time interval based on a time corresponding to a first status report of the plurality of status reports and a time corresponding to a second status report of the plurality of status reports.

6. The computer-implemented method of claim 5, wherein each report status comprises at least one of a processing unit load, a number of performed garbage collections, and a time stamp.

7. The computer-implemented method of claim 1, wherein the snapshot is generated in response to an application performing a specified event.

8. The computer-implemented method of claim 1, further comprising generating a second snapshot corresponding to a subset of the profiling data associated with the snapshot, the second snapshot being generated based on applying a logical filter to the profiling data associated with the snapshot.

9. A non-transitory computer-readable storage medium coupled to one or more processors and having instructions stored thereon which, when executed by the one or more processors, cause the one or more processors to perform operations comprising:
    executing a profiling session to profile one or more applications running on a virtual machine executed on a server;
    collecting profiling data over a first time interval during the profiling session;
    receiving user input generated at a client device, the client device being in communication with the server, the user input being received during the profiling session;
    receiving user input generated at a client device, the client device being in communication with the server, the user input being received during the profiling session;
    in response to the user input, generating, by the server, a first snapshot marker within the profiling data based on the user input, generating a second snapshot marker within the profiling data, wherein a second time interval is defined between the first and second snapshot markers, and generating a snapshot corresponding to a subset of the profiling data, the snapshot being generated during the profiling session and being identified based on the second time interval that is within the first time interval;
    transmitting, from the server and to the client device, only the subset of the profiling data to generate a snapshot view for display on the client device, the snapshot view corresponding to the subset of the profiling data; and receiving, by the server, a user selection of a called methods entry point, and in response, providing a list of methods called during the snapshot.

10. The non-transitory computer-readable storage medium of claim 9, wherein the operations further comprise receiving user input indicating one or more logical filter definitions, wherein the snapshot is generated based on the one or more logical filter definitions.

11. The non-transitory computer-readable storage medium of claim 10, wherein the one or more logical filter definitions comprise one or more of a class name, a method name, a thread name, an application name, a user name, and an execution path.

12. The non-transitory computer-readable storage medium of claim 9, wherein the operations further comprise receiving second user input during running of the application, wherein the second snapshot marker is generated based on the second user input.

13. The non-transitory computer-readable storage medium of claim 9, wherein the operations further comprise:

defining a report interval, the report interval indicating a frequency for generating a status report of a back-end application;

generating a plurality of status reports based on the report interval, wherein each status report and a corresponding time are provided in the profiling data; and determining the second time interval based on a time corresponding to a first status report of the plurality of status reports and a time corresponding to a second status report of the plurality of status reports.

14. The non-transitory computer-readable storage medium of claim 13, wherein each report status comprises at least one of a processing unit load, a number of performed garbage collections, and a time stamp.

15. The non-transitory computer-readable storage medium of claim 9, wherein the snapshot is generated in response to an application performing a specified event.

16. The non-transitory computer-readable storage medium of claim 9, wherein the operations further comprise generating a second snapshot corresponding to a subset of the profiling data associated with the snapshot, the second snapshot being generated based on applying a logical filter to the profiling data associated with the snapshot.

17. A system, comprising:

a server including a computer-readable storage medium coupled to one or more processors and having instructions stored thereon which, when executed by the one or more processors, cause the one or more processors to perform operations comprising:

executing a profiling session to profile one or more applications running on a virtual machine executed on the server;

collecting profiling data over a first time interval during the profiling session;

receiving user input generated at a client device, the client device being in communication with the server, the user input being received during the profiling session;

in response to the user input, generating, by the server, a first snapshot marker within the profiling data based on the user input, generating a second snapshot marker within the profiling data, wherein a second time interval is defined between the first and second snapshot markers, and generating a snapshot corresponding to a subset of the profiling data, the snapshot being generated during the profiling session and being identified based on the second time interval that is within the first time interval;

transmitting, from the server and to the client device, only the subset of the profiling data to generate a snapshot view for display on the client device, the snapshot view corresponding to the subset of the profiling data; and receiving, by the server, a user selection of a called methods entry point, and in response, providing a list of methods called during the snapshot.

18. The system of claim 17, wherein the operations further comprise receiving user input indicating one or more logical filter definitions, wherein the snapshot is generated based on the one or more logical filter definitions.

19. The system of claim 18, wherein the one or more logical filter definitions comprise one or more of a class name, a method name, a thread name, an application name, a user name, and an execution path.

20. The system of claim 17, wherein the operations further comprise receiving second user input during running of the application, wherein the second snapshot marker is generated based on the second user input.

21. The system of claim 17, wherein the operations further comprise:

defining a report interval, the report interval indicating a frequency for generating a status report of a back-end application;

generating a plurality of status reports based on the report interval, wherein each status report and a corresponding time are provided in the profiling data; and determining the second time interval based on a time corresponding to a first status report of the plurality of status reports and a time corresponding to a second status report of the plurality of status reports.

22. The system of claim 21, wherein each report status comprises at least one of a processing unit load, a number of performed garbage collections, and a time stamp.

23. The system of claim 17, wherein the snapshot is generated in response to an application performing a specified event.

24. The system of claim 17, wherein the operations further comprise generating a second snapshot corresponding to a subset of the profiling data associated with the snapshot, the second snapshot being generated based on applying a logical filter to the profiling data associated with the snapshot.

* * * * *